United States Patent
Honma

(10) Patent No.: US 8,997,127 B2
(45) Date of Patent: Mar. 31, 2015

(54) MEDIUM TRANSPORTING UNIT AND MEDIUM PROCESSING APPARATUS

(71) Applicant: Seiko Epson Corporation, Tokyo (JP)

(72) Inventor: Ryo Honma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 13/925,253

(22) Filed: Jun. 24, 2013

(65) Prior Publication Data

US 2013/0287539 A1    Oct. 31, 2013

Related U.S. Application Data

(63) Continuation of application No. 13/541,953, filed on Jul. 5, 2012, now Pat. No. 8,495,665, which is a continuation of application No. 12/080,330, filed on Apr. 2, 2008, now Pat. No. 8,245,247.

(30) Foreign Application Priority Data

Apr. 5, 2007    (JP) ................. 2007-099886

(51) Int. Cl.
*G11B 17/26*    (2006.01)
*G11B 17/022*   (2006.01)
*G11B 17/08*    (2006.01)
*G11B 23/40*    (2006.01)

(52) U.S. Cl.
CPC .............. *G11B 17/022* (2013.01); *G11B 17/08* (2013.01); *G11B 23/40* (2013.01)
USPC ........................................ 720/615

(58) Field of Classification Search
USPC ........................................ 720/615
See application file for complete search history.

(56) References Cited

U.S. PATENT DOCUMENTS

| | | | |
|---|---|---|---|
| 5,622,362 A | 4/1997 | Shiiki et al. | |
| 5,692,878 A | 12/1997 | Freund | |
| 6,042,205 A | 3/2000 | Coffin et al. | |
| 6,122,231 A | 9/2000 | Watanabe et al. | |
| 6,802,070 B2 | 10/2004 | Britz et al. | |
| 7,360,812 B2 * | 4/2008 | Ionescu ................. | 294/27.1 |
| 7,885,148 B2 | 2/2011 | Ikeda | |
| 8,245,247 B2 | 8/2012 | Honma | |
| 2002/0009022 A1 | 1/2002 | Britz et al. | |
| 2004/0005213 A1 | 1/2004 | Hegedus | |
| 2005/0045606 A1 | 3/2005 | Ito et al. | |
| 2005/0117947 A1 | 6/2005 | Shiaku | |
| 2008/0250437 A1 | 10/2008 | Honma | |
| 2012/0269610 A1 | 10/2012 | Honma | |

FOREIGN PATENT DOCUMENTS

| | | |
|---|---|---|
| DE | 295 18 578 U1 | 1/1996 |
| DE | 10 2005 049 843 A1 | 4/2006 |

(Continued)

*Primary Examiner* — Mark Blouin
(74) *Attorney, Agent, or Firm* — Nutter McClennen & Fish LLP; John J. Penny, Jr.

(57) ABSTRACT

A holding mechanism is operable to hold a top medium from a plurality of plate-shaped media accommodated in a stacker in a stacked manner. A transport arm supports the holding mechanism. When the lift mechanism lifts down the transport arm, one of a first elastic pressing force and a second elastic pressing force greater than the first elastic pressing force is selectively applied from the holding mechanism to an upper surface of the top medium.

4 Claims, 28 Drawing Sheets

(56) References Cited

FOREIGN PATENT DOCUMENTS

| | | |
|---|---|---|
| EP | 0 639 519 A1 | 2/1995 |
| EP | 1 510 482 A1 | 3/2005 |
| JP | 63-160928 A | 7/1988 |
| JP | 08-051140 A | 2/1996 |
| JP | 11-045464 A | 2/1999 |
| JP | 2000-222809 A | 8/2000 |
| JP | 2002-052488 A | 2/2002 |
| JP | 2003-331503 A | 11/2003 |
| JP | 2004-095064 A | 3/2004 |
| JP | 2005-104012 A | 4/2005 |
| JP | 2006-202379 A | 8/2006 |

* cited by examiner

MEDIUM TRANSPORTING UNIT AND MEDIUM PROCESSING APPARATUS

Priority is claimed under 35 U.S.C. §120 to U.S. patent application Ser. No. 13/541,953, which was filed on Jul. 5, 2012, which claims priority under 35 U.S.C. §120 to U.S. patent application Ser. No. 12/080,330, which was filed on Apr. 2, 2008, which claims priority under 35 U.S.C. §119 to Japanese Patent Application No. 2007-099886 filed Apr. 5, 2007, which are hereby incorporated herein by reference in their entireties.

BACKGROUND

The present invention relates to a medium transporting unit that transports a plate-like medium such as a CD or a DVD and a medium processing apparatus having the medium transporting unit.

BACKGROUND ART

In recent years, medium processing apparatuses such as disc dubbing apparatuses that record data on mediums such as plural blank CDs or DVDs and CD/DVD publishers that can produce and publish a medium by performing a data recording operation and a label printing operation were used. Such a kind of medium processing apparatus was known which has a drive for driving data on a medium, a printer for performing a printing operation on a label surface of the medium, and a medium transporting unit for holding and transporting the medium to the drive or the printer (for example, see Patent Document 1).
Patent Document 1: Japanese Patent Publication No. 2006-202379A However, blank mediums that have not been subjected to a recording process and the like are stacked in the medium stacker and a slight clearance in the radius direction of the mediums is generated between the mediums received in the stacker and the stacker. Accordingly, since the mediums stacked in the stacker are randomly received in the stacker, the center positions of the mediums may slightly differ from the pickup center of the mediums with the medium transporting unit. In this case, at the time of holding the inner surface of the center hole of the medium by the use of claws of a holding portion of the medium transporting unit, the holding force moves in the circumferential direction and thus the medium may not be satisfactorily held with good balance, thereby causing the holding failure.

The upper and lower mediums may be adhered to each other in the stacker so as to cause an adhesive force therebetween. In this case, when the holding force runs off in the circumferential direction, it is difficult to satisfactorily lift up only the uppermost medium.

For example, even when the medium transporting unit is provided with a positioning guide having a cone shape directed downward and the guide is inserted into the center hole of the medium, the medium does not slide in horizontal direction and thus it is difficult to position the center of the medium with respect to the pickup center. Accordingly, at the time of holding the inner circumferential surface of the center hole of the medium, the holding force moves in the circumferential direction so that the medium is not held satisfactorily with good balance, thereby causing the holding failure.

In this case, the insertion force of the positioning guide can be enhanced by increasing the pressing force of the holding portion on the medium. However, in a tray of a drive in which a single medium is received, a great load is applied to the tray which should move with high precision due to the pressing force of the holding portion, thereby affecting the movement precision and damaging a moving mechanism of the tray.

SUMMARY

An object of at least on embodiment of the invention is to provide a medium transporting unit that can satisfactorily position and hold a medium as a holding target with an appropriate force, regardless of a reception state of the medium to be held, and a medium processing apparatus having the medium transporting unit.

In order to accomplish the above-mentioned objects, according to an aspect of at least on embodiment of the invention, there is provided a medium transporting unit for transporting a top medium from a plurality of plate-shaped media accommodated in a stacker in a stacked manner, the medium transporting unit comprising: a holding mechanism operable to hold the top medium; and a transport arm provided with the holding mechanism; wherein when the holding mechanism holds the top medium, one of a first pressing force and a second pressing force greater than the first pressing force is selectively applied from the holding mechanism to an upper surface of the top medium.

The second pressing force may be applied to the upper surface of the top medium when a plurality of media is accommodated in the stacker.

The first pressing force is applied to the upper surface of the top medium when a single medium is accommodated in the stacker.

According to the above-mentioned configuration of the medium transporting unit, since the holding mechanism comes in contact with the medium with one of the first pressing force and the second pressing force greater than the first pressing force at the time of lifting down the transport arm, it is possible to position the medium with the medium guide and to hold the medium with the holding mechanism with the proper pressing force depending on the reception state of the medium.

For example, when a single medium received in a drive or a tray of a printer which hardly requires the pressing force for positioning the medium is positioned and held, the holding portion can be pressed with the relatively small first pressing force. When a large positional difference occurs and the uppermost medium of the mediums stacked in the stacker, in which the adjacent mediums are adhered to each other to generate an adhesive force, is positioned and held, the holding mechanism can be pressed against the medium with the second pressing force greater than the first pressing force. Accordingly, in the drive or the tray of the printer, it is possible to hold the medium without causing any problem with an excessive pressing force.

The medium transporting unit may further comprise and a lift mechanism operable to lift the transport arm up and down. The transport arm may include: a lifted member fixed to the lift mechanism to be lifted up and down; a first urging member operable to urge the lifted member upward with a first urging force so that the holding mechanism applies the first pressing force to the top medium; and a second urging member operable to urge the lifted member upward with a second urging force greater than the first urging force so that the holding mechanism applies the second pressing force to the top medium; and the second urging member may apply the second urging force to the lifted member when the lifted member is lifted down by a predetermined distance.

According to this configuration, when the lifted member is lifted down by the predetermined distance against the first urging member, the second urging member is operated by the lifted member. Accordingly, it is possible to easily and properly set the urging force of the first urging member as the first elastic pressing force and to set the urging force of the first urging member, the bending force of the transport arm, and the urging force of the second urging member as the second elastic pressing force.

The transport arm may further include an arm body and a pressing lever, one end of which is swingably supported in the arm body; the first urging member may include a first tension spring, one end of which is fixed to the arm body and the other end of which is fixed to the lifted member; the second urging member may include a second tension spring, one end of which is fixed to the arm body and the other end of which is fixed to the other end of the pressing lever; and the pressing lever may swing against the second urging force of the second tension spring after the lifted member comes in contact with the pressing lever and is lifted down.

According to this configuration, the urging force of the first tension spring can be used as the first elastic pressing force until the lifted member comes in contact with the pressing lever. When the lifted member comes in contact with the pressing lever and thus the pressing lever swings, the urging force of the first tension spring, the bending force of the transport arm, and the urging force of the second tension spring can be used as the second elastic pressing force.

The lift mechanism may include a timing belt; and the lifted member may include a belt clip fixed to the timing belt.

According to this configuration, the transport arm can be fixed to the lift mechanism with a simple structure.

The holding mechanism may include a contact portion adapted to come in contact with the upper surface of the top medium in the vicinity of a center hole formed on the top medium.

According to this configuration, a problem with the adhesion between the mediums can be easily solved.

The holding mechanism may include a pressing member operable to press an inner peripheral surface of a center hole formed on the top medium.

According to this configuration, the holding mechanism can hold the medium with a simple structure.

The holding mechanism may include a medium guide having a circular truncated cone shape directed downward and adapted to be inserted into a center hole formed on the top medium.

According to this configuration, the uppermost medium can slide horizontally for positioning by the use of the medium guide against the adhesive force between the uppermost medium and the right below medium and can be held by the use of the holding mechanism.

The first pressing force may be generated by the first urging force of the first urging member; and the second pressing force may be generated by the first urging force of the first urging member and the second urging force of the second urging member.

According to the other aspect of at least on embodiment of the invention, there is provided a medium processing apparatus comprising: the above stacker; the medium transporting unit; and a media drive having at least one of a function for writing data on the transported medium which is transported by the medium transporting unit and a function for reading data on the transported medium.

According to the medium processing apparatus having the Above-mentioned configuration, since it includes the medium transporting unit that can satisfactorily position and hold the medium, it is possible to provide a medium processing apparatus with high reliability.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, a medium transporting unit according to an embodiment of the invention and a medium processing apparatus having the medium transporting unit will be described with reference to the drawings.

In this embodiment, the invention is applied to a medium processing apparatus including a publisher.

Figure 1:
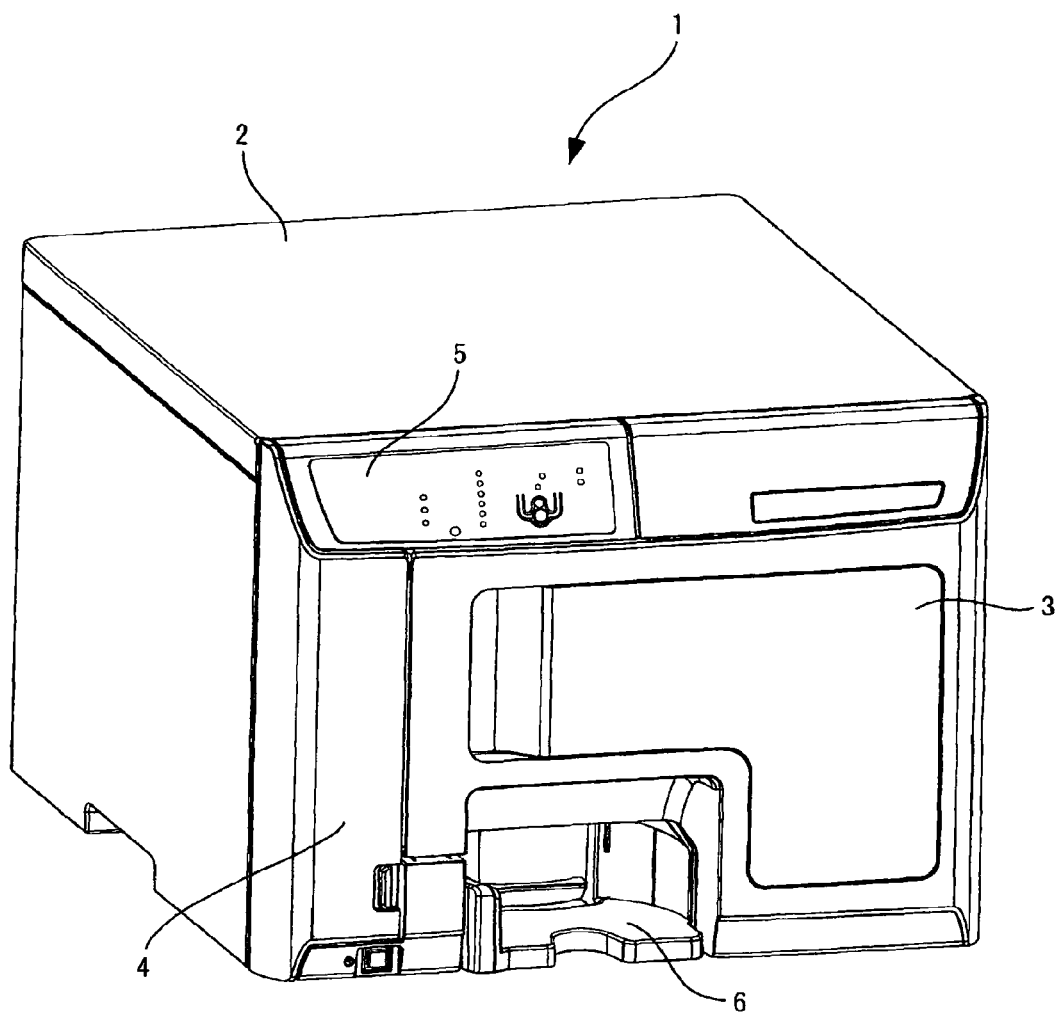
FIG. 1 is a perspective view illustrating an appearance of a publisher (medium processing apparatus)

As shown in FIG. 1, the publisher 1 is a medium processing apparatus for recording data on a disc-like medium such as CD or DVD or printing an image on a label surface of the medium and has a case 2 having a substantially rectangular hexahedral shape. Shutters 3 and 4 which can be opened and closed slidably in the lateral direction are attached to the front surface of the case 2. An operation surface 5 having display lamps, operation buttons, and the like arranged thereon is disposed at the left-upper end portion of the case 2 and a medium discharge port 6 is disposed at the lower end of the case 2.

Figure 2:
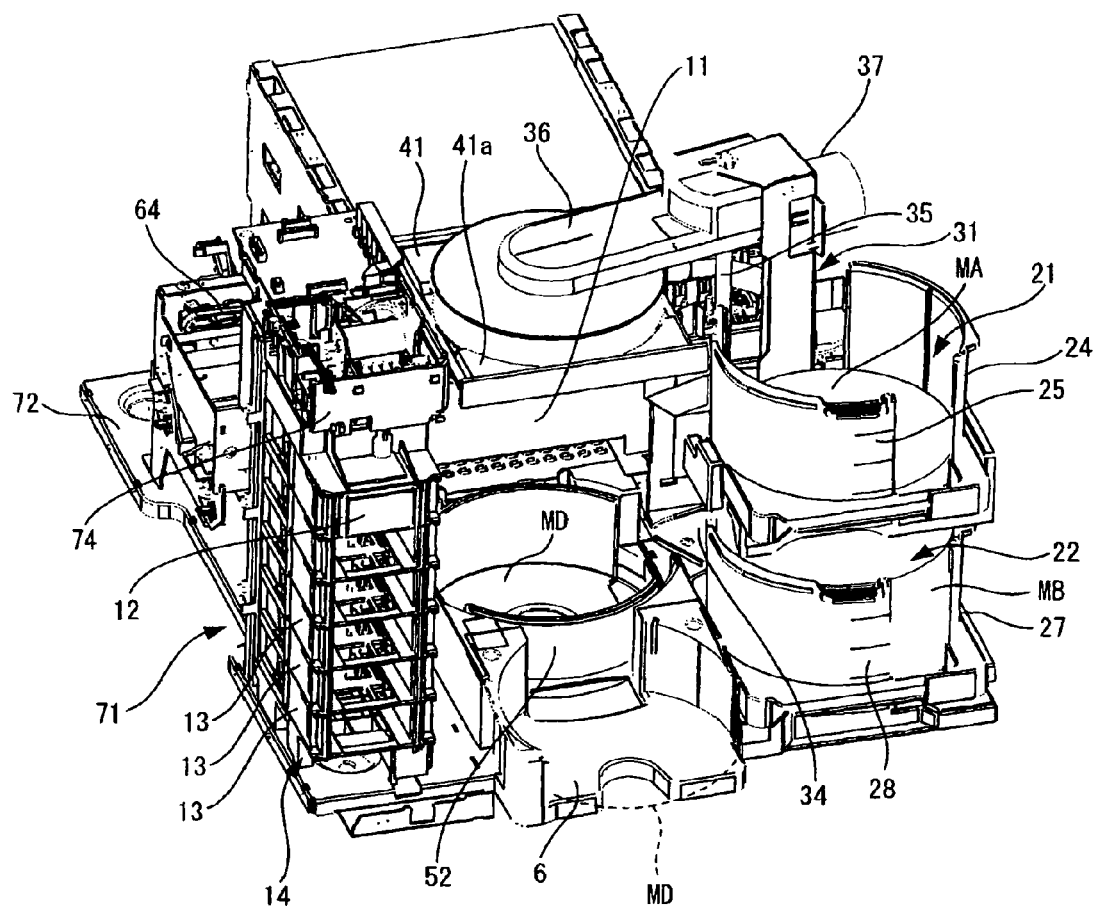
FIG. 2 is a perspective view illustrating the front side of the publisher with a case removed from the publisher.

The right shutter 3 as viewed from the front side is a door which is opened and closed at the time of setting a blank medium MA not used or taking out the completed medium MB (see FIG. 2).

The left shutter 4 as viewed from the front side is opened and closed at the time of replacing an ink cartridge 12 of a label printer 11 (see FIG. 2). By opening the shutter 4, a cartridge mounting section 14 (see FIG. 2) having plural cartridge holders 13 arranged in the vertical direction is exposed.

As shown in FIG. 2, in the case 2 of the medium processing apparatus 1, a blank medium stacker 21 as a medium storage unit in which plural blank mediums MA not yet used and not yet subjected to a data recording process can be stacked and a completed medium stacker 22 as a medium storage unit in which completed mediums MB are disposed vertically so that the center lines of the stored mediums are aligned with each other. The blank medium stacker 21 and the completed medium stacker 22 can be attached to and detached from predetermined positions shown in FIG. 2.

The blank medium stacker 21 has a pair of arc-shaped frames 24 and 25. Accordingly, the blank mediums MA can be received from the top and can be stacked coaxially in the stacker. The operation of receiving or replenishing the blank mediums MA in the blank medium stacker 21 can be simply performed by opening the shutter 3 and taking out the stacker.

The completed medium stacker 22 has the same structure and includes a pair of arc-shaped frames 27 and 28. Accordingly, the completed mediums MB can be received from the top and can be stacked coaxially in the stacker.

The completed mediums MB (that is, mediums having been completely subjected to a data recording process and a label-surface printing process) may be taken out through the shutter 3.

A medium transporting unit 31 is disposed in the back of the blank medium stacker 21 and the completed medium stacker 22. In the medium transporting unit 31, a chassis 32 is swingably attached to a vertical guide shaft 35 vertically suspended between a base 72 and the top plate of the case 2 (see FIG. 5). A fan-shaped final-stage gear 109 is fixed to a horizontal supporting plate 34 of the chassis 32 (see FIG. 5). The transport arm 36 is supported by the chassis 32 so as to freely go up and down. The transport arm 36 can be lifted up and down along the vertical guide shaft 35 by a driving motor 37 which can be a step motor and can horizontally swing about the vertical guide shaft 35. A medium transported to the medium discharge port 6 by the medium transporting unit 31 can be taken out of the medium discharge port 6.

Two medium drives 41 vertically stacked are disposed on a side of the upper and lower stackers 21 and 22 and the medium transporting unit 31. A carriage 62 (see FIG. 4) of a label printer 11 is movably disposed below the medium drives 41.

The medium drives 41 have medium trays 41a that can move between a data recording position where data is recorded on a medium and a medium transferring position where the medium is transferred, respectively.

Figure 3:
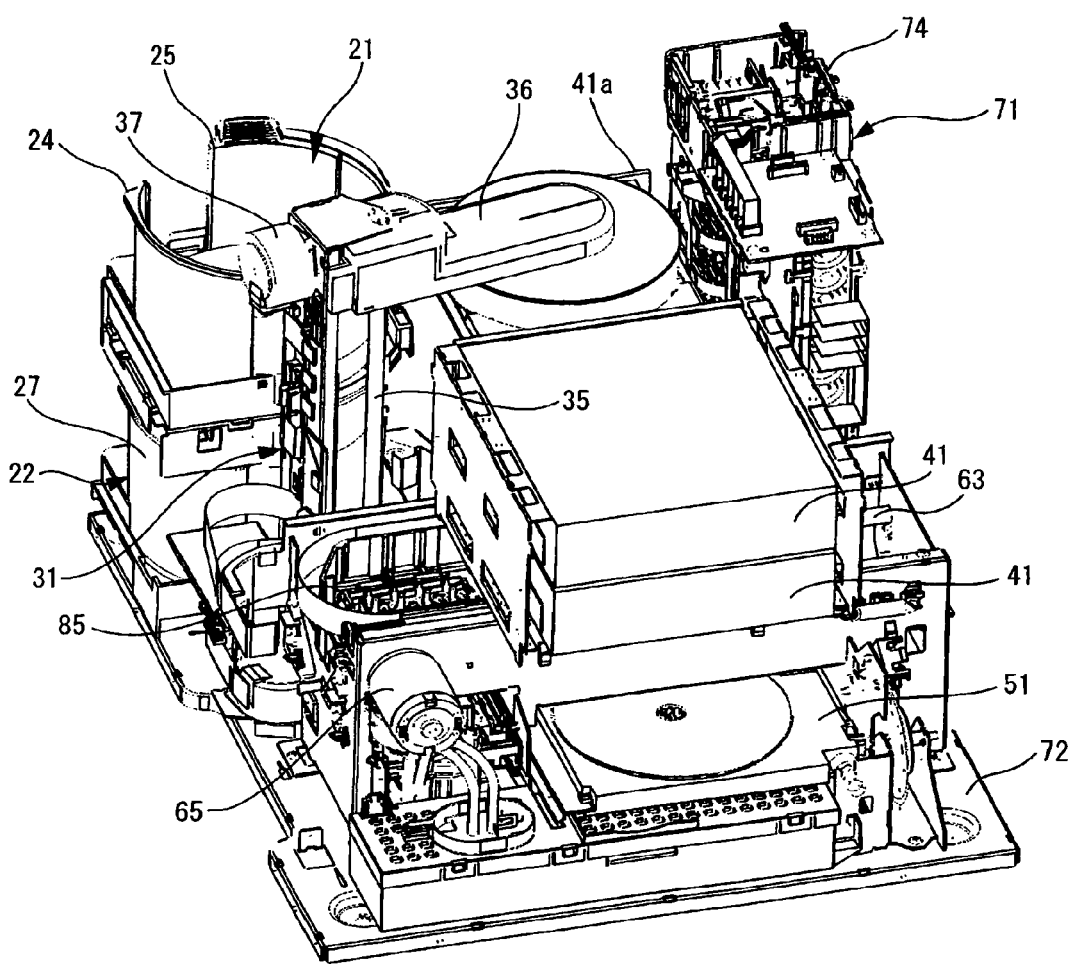
FIG. 3 is a perspective view illustrating the rear side of the publisher with the case removed from the publisher.

The label printer 11 has a medium tray 51 that can move between a printing position where an image is printed on a label surface of the medium and a medium transferring position where the medium is transferred (see FIG. 3).

In FIGS. 2 and 3, a state where the medium tray 41a of the upper medium drive 41 is drawn forward and located at the medium transferring position and a state where the medium tray 51 of the lower label printer 11 is located at the label printing position are shown. The label printer 11 is an ink jet printer and employs ink cartridges 12 of various colors (6 colors of black, cyan, magenta, yellow, light cyan, and light magenta in this embodiment) as the ink supply mechanism 71. The ink cartridges 12 are mounted on the cartridge holders 13 of the cartridge mounting section 14 from the front side.

Here, a gap through which the transport arm 36 of the medium transporting unit 31 can be lifted up and down is formed between the pair of frames 24 and 25 of the blank medium stacker 21 and between the pair of frames 27 and 28 of the completed mediums stacker 22. A clearance allowing the transport arm 36 of the medium transporting unit 31 to horizontally swing and to be located just above the completed medium stacker 22 is opened between the blank medium stacker 21 and the completed medium stacker 22. When the medium tray 41a is pushed into the medium drive 41, the transport arm 36 of the medium transporting unit 31 can be lifted down to access the medium tray 51 located at the medium transfer position. Accordingly, it is possible to transport the mediums to the individual elements by combination of the lifting operation and the swinging operation of the transport arm 36.

A waste stacker 52 for storing waste mediums MD is disposed below the medium transfer position of the medium tray 51. For example, about 30 waste mediums MD can be stored in the waste stacker 52. In a state where the medium tray 51 retreats from the medium transfer position above the waste stacker 52 to the data recording position, the waste mediums MD can be supplied to the waste stacker 52 by the use of the transport arm 36 of the medium transporting unit 31.

Due to the above-mentioned configuration, the transport arm 36 of the medium transporting unit 31 can transport a medium such as a CD or DVD among the blank medium stacker 21, the completed medium stacker 22, the waste stacker 52, the medium tray 41a of the medium drive 41, and the medium tray 51 of the label printer 11.

Figure 4:
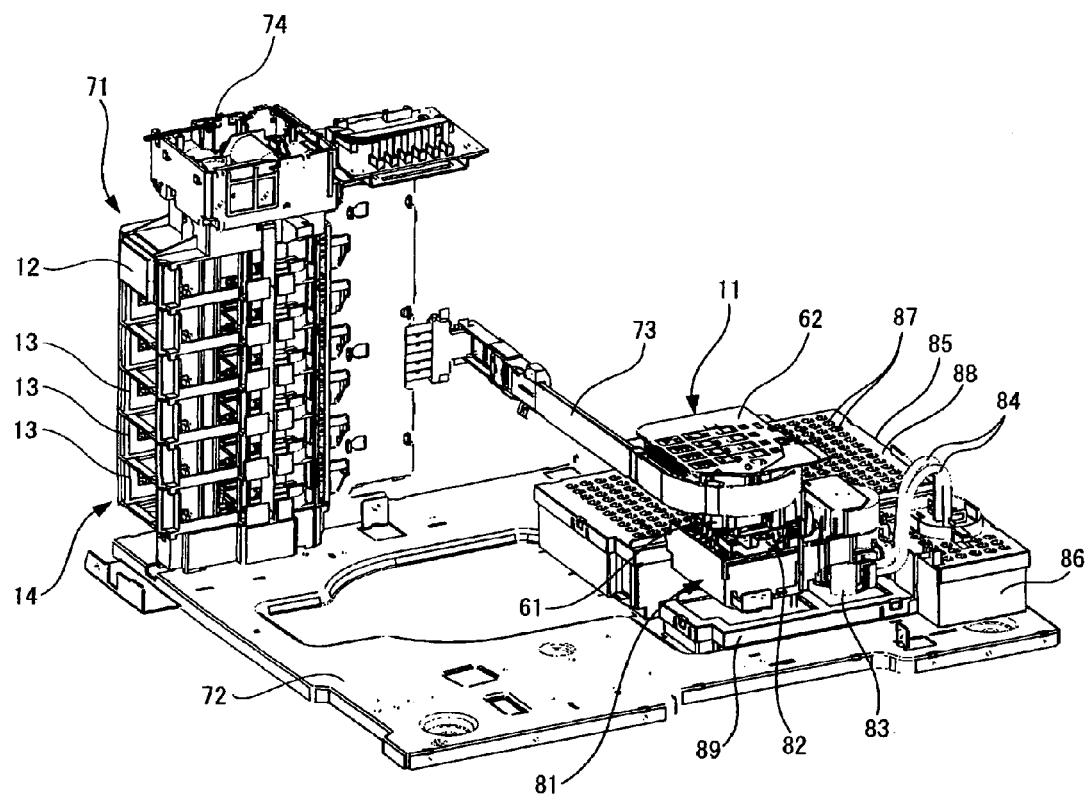
FIG. 4 is a perspective view illustrating a recording unit of the publisher.

As shown in FIG. 4, the label printer 11 includes a carriage 62 having an ink jet head 61 with ink ejecting nozzles (not shown). The carriage 62 horizontally reciprocates along a carriage guide shaft 63 by means of the driving force of a carriage motor 65 (see FIG. 3).

The label printer 11 includes an ink supply mechanism 71 having a cartridge mounting section 14 to be mounted with ink cartridges 12 (see FIG. 2). The ink supply mechanism 71 has a vertical structure and is formed upright in the vertical direction on a base 72 of the publisher 1. An end of a flexible ink supply tube 73 is connected to the ink supply mechanism 71 and the other end of the ink supply tube 73 is connected to the carriage 62 (see FIG. 4).

The ink of the ink cartridges 12 mounted on the ink supply mechanism 71 is supplied to the carriage 62 through the ink supply tube 73, is supplied to the ink jet head 61 through a damper unit and a pressure distribution control unit (not shown) disposed in the carriage 62, and then is ejected from the ink nozzles (not shown).

A pressurizing mechanism 74 is disposed in the ink supply mechanism 71 so as to put the main portion is above the ink supply mechanism The pressurizing mechanism 74 pressurizes the ink cartridges 12 by blowing out compressed air, thereby sending out the ink stored in ink packs of the ink cartridges 12.

A head maintenance mechanism 81 is disposed below the home position (position shown in FIG. 4) of the carriage 62.

The head maintenance mechanism 81 includes a head cap 82 covering the ink nozzles of the ink jet head 61 exposed from the bottom surface of the carriage 62 located at the home position and a waste ink suction pump 83 sucking the ink discharged to the head cap 82 due to a head cleaning operation or an ink filling operation of the ink jet head 61.

The ink sucked by the waste ink suction pump 83 of the head maintenance mechanism 81 is sent to a waste ink tank 85 through a tube 84.

In the waste ink tank 85, an absorbing material is disposed in a case 86 and the top surface is covered with a cover 88 having plural ventholes 87.

A waste ink receiver 89 as a part of the waste ink tank 85 is disposed below the head maintenance mechanism 81 and receives the ink from the head maintenance mechanism 81. Then, the ink is absorbed by the absorbing material.

Figure 5:
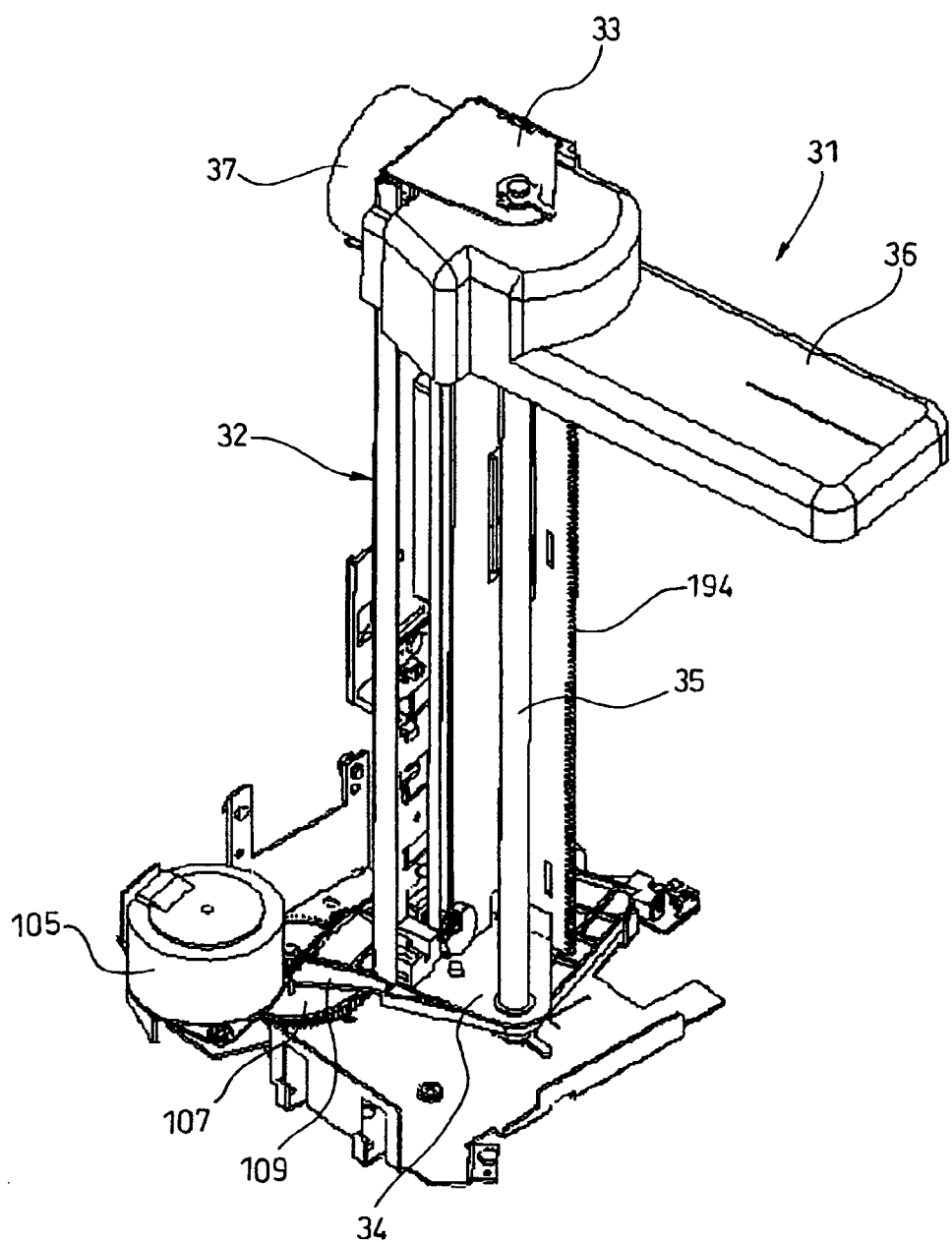
FIG. 5 is a perspective view illustrating a medium transporting unit.

As shown in FIG. 5, in the medium transporting unit 31, the horizontal supporting plate 34 and the top plate 33 of the cassis 32 is supported by the vertical guide shaft 35 disposed in the vertical direction. Here, the chassis 32 is swingable. The transport arm 36 is supported by the chassis 32 so as to be lifted up and down.

Figure 6:
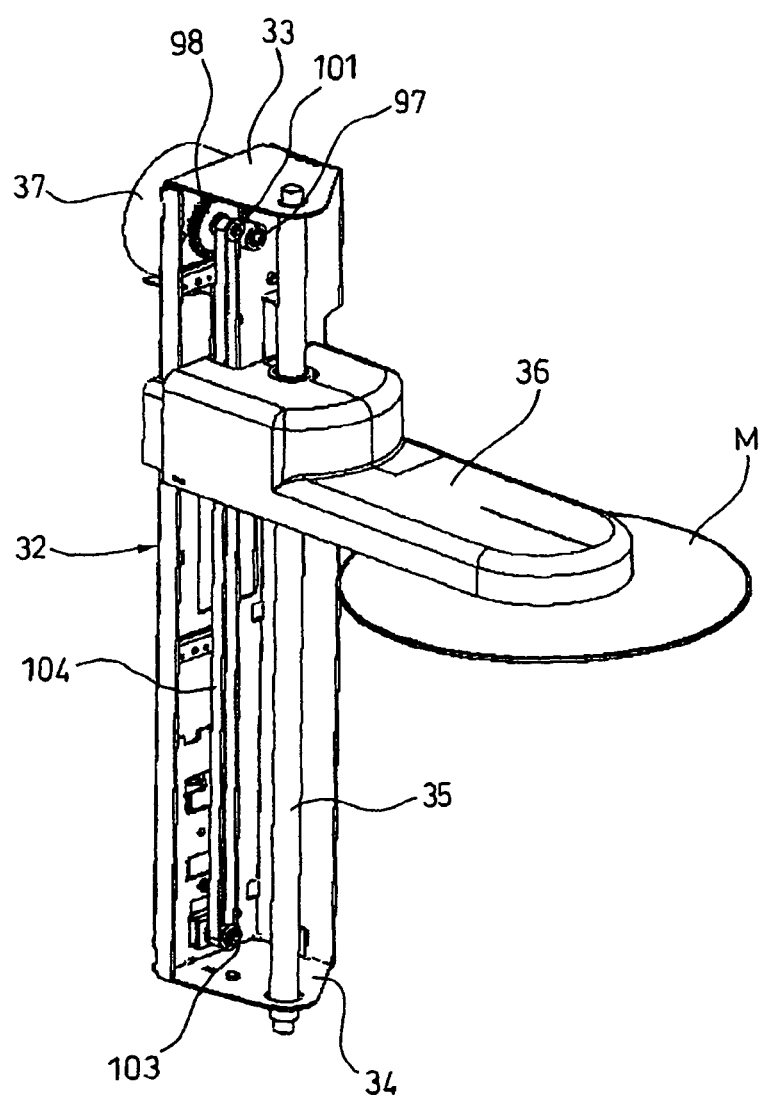
FIG. 6 is a perspective view illustrating a part of the medium transporting unit.
Figure 7:
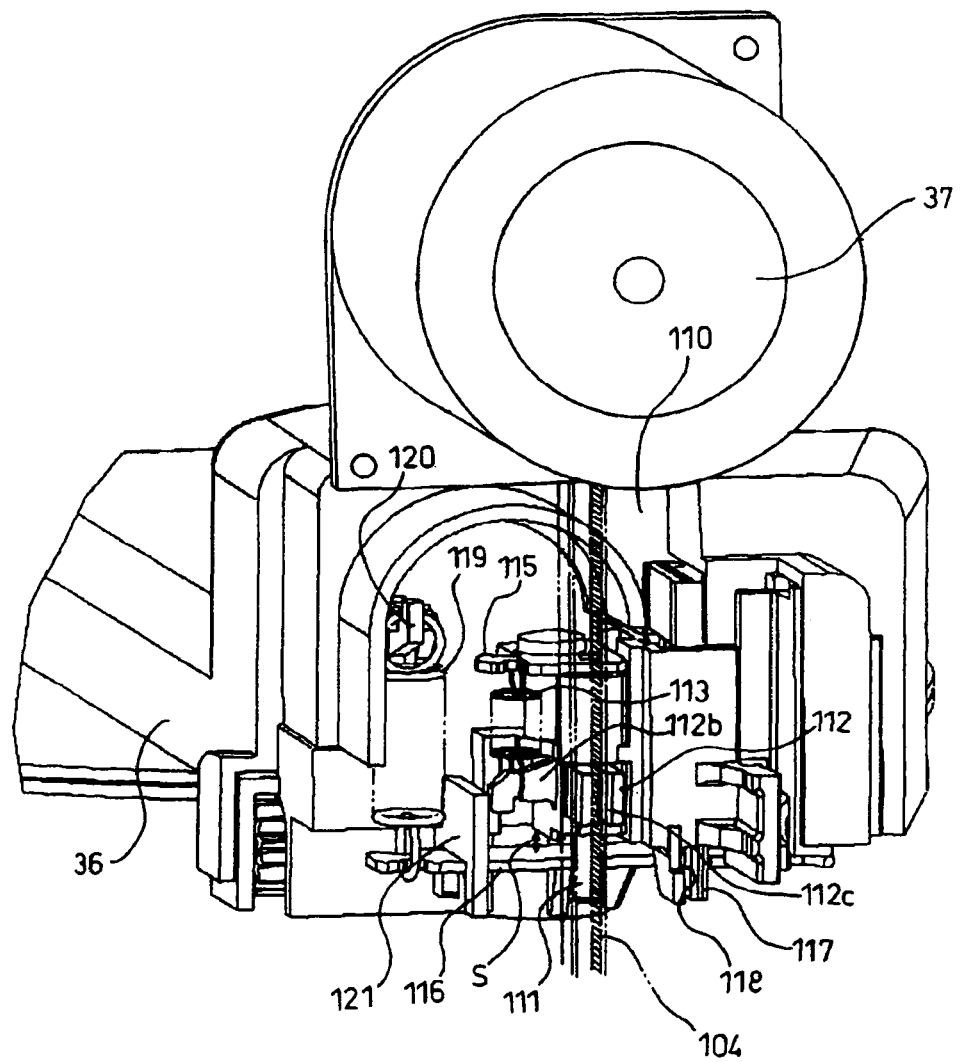
FIG. 7 is a perspective view illustrating a connection mechanism between a transport arm and a timing belt.

As shown in FIG. 6, the lift mechanism of the transport arm 36 includes a lifting driving motor (lift mechanism) 37 as a driving source, which employs a pulse motor in this embodiment. The rotation of the driving motor 37 is transmitted to a driving pulley 101 through a pinion 97 and a transmission gear 98 fitted to an output shaft of the driving motor 37. The driving pulley 101 is supported to be rotatable about a horizontal rotation shaft in the vicinity of the top end of the chassis 32. A driven pulley 103 is supported to be rotatable about the horizontal rotation shaft in the vicinity of the bottom end of the chassis 32. A timing belt (lift mechanism) 104 is suspended on the driving pulley 101 and the driven pulley 103. As shown in FIG. 7, a base 110 of the transport arm 36 is connected to one horizontal end of the timing belt 104 through a belt clip (lift member) 112.

Accordingly, when the driving motor 37 is activated, the timing belt 104 moves in the vertical direction and the transport arm 36 attached thereto is thus lifted up and down along the vertical guide shaft 35. A sensor not shown for detecting the home position of the timing belt 104 is attached to the chassis 32.

As shown in FIG. 5, a rotation mechanism of the transport arm 36 includes a rotational driving motor 105 as a driving source and a pinion (not shown) is fitted to the output shaft of the driving motor 105. The rotation of the pinion is transmitted to the fan-shaped final-stage gear 109 through a reduction gear train having a transmission gear 107. The fan-shaped final-stage gear 109 can rotate horizontally about the vertical guide shaft 35. The final-stage gear 109 is mounted to the chassis 32 having constituent elements of the lift mechanism for the transport arm 36. When the driving motor 105 is activated, the fan-shaped final-stage gear 109 rotates horizontally and thus the chassis 32 mounted thereon monolithically rotates horizontally about the vertical guide shaft 35. As a result, the transport arm 36 retained by the lift mechanism mounted on the chassis 32 rotates horizontally about the vertical guide shaft 35. A sensor not shown for detecting the home position (a position just above the medium trays 41a and 51 where the transport arm 36 is located at the medium transfer position) of the final-stage gear 109 and positions just above the blank medium stacker 21 and the completed medium stacker 22 is fitted to the base 72.

Next, a supporting structure of the transport arm 36 will be described.

Figure 8:
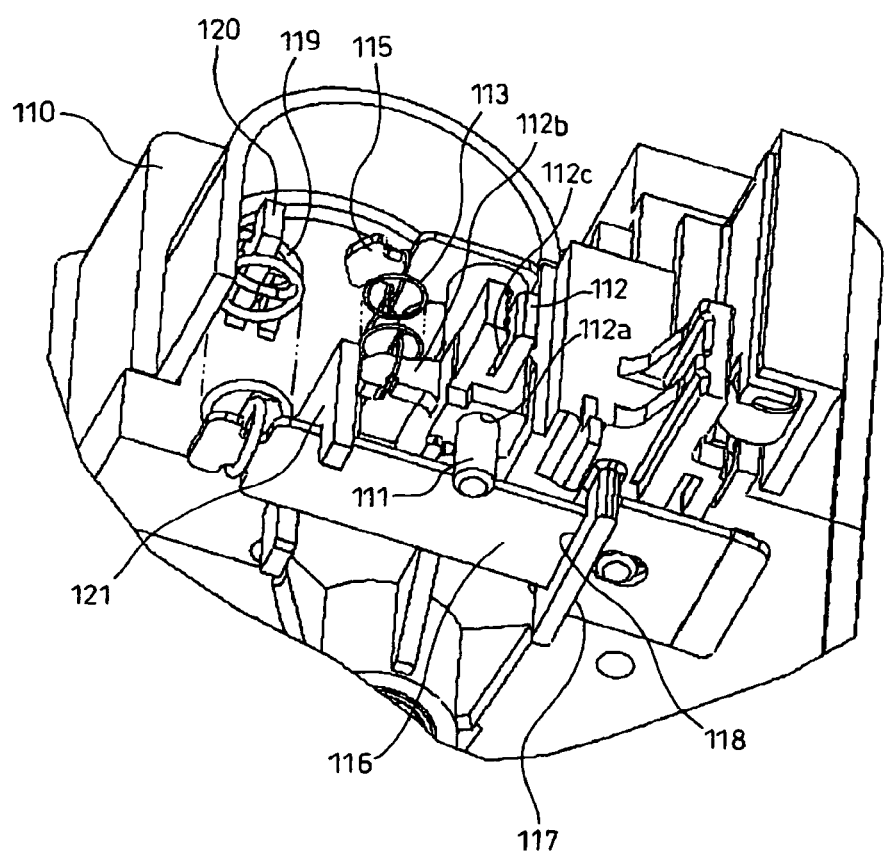
FIG. 8 is an enlarged perspective view illustrating the connection mechanism between the transport arm and the timing belt as viewed from the bottom.

As shown in FIGS. 7 and 8, a sliding shaft (support portion) 111 is vertically disposed on the base 110 of the transport arm 36. The sliding shaft 111 is inserted through a shaft hole 112a of the belt clip 112 fixed by holding the timing belt 104 (see FIG. 7) so as to be slidable from the upside. In FIG. 8, the timing belt 104 is omitted.

A locking piece 112b is formed in the belt clip 112. An end of a first tension spring (first elastic urging means 113) which is a coil spring is connected to the locking piece 112b. The other end of the first tension spring 113 is connected to a fixed piece 115 formed in the base 110 of the transport arm 36 and disposed above the locking piece 112b. Accordingly, the base 110 of the transport arm 36 is urged downward by the first tension spring 113.

A fixing portion 112c for fixing the timing belt 104 therebetween is formed in the belt clip 112.

A pressing lever 116 attached to the base 110 of the transport arm 36 is disposed below the belt clip 112. The pressing lever 116 is laterally inserted through an insertion hole 118 formed in a supporting plate 117 disposed on the bottom of the base 110 of the transport arm 36 and is swingable about a supporting point in the supporting plate 117. An end of a second tension spring (second elastic urging means) 119 formed of a coil spring having an urging force greater than that of the first tension spring 113 is connected to an end of the pressing lever 116 and the other end of the second tension spring 119 is connected to a fixed piece 120 that is formed in the base and disposed above the end of the pressing lever 116. Accordingly, the end of the pressing lever 116 is urged upward by the second tension spring 119. A swing regulating piece 121 formed on the base 110 is disposed above the vicinity of the end of the pressing lever 116 and the swing of the pressing lever 116 urged upward by the second tension spring 119 is regulated to a predetermined position. The belt clip 112 is disposed at a position apart from the pressing lever 116 regulated by the swing regulating piece 121, by clearance S.

In the above-mentioned supporting structure, when the timing belt 104 is driven by the lifting driving motor 37 (see FIG. 5), the transport arm 36 is lifted up and down monolithically with the belt clip 112 fixed to the timing belt 104. When a medium guide 133 to be described later or a holding mechanism 130 comes in contact with the medium and a down load of the transport arm 36 increases, only the belt clip 112 moves down against the urging force of the first tension spring 113 relative to the transport arm 36. When the belt clip 112 further moves down by means of the timing belt 104, the belt clip 112 comes in contact with the pressing lever 116, the transport arm 36 is slightly bent, and then the pressing lever 116 swings about a support point in the supporting plate 117 against the urging force of the second tension spring 119.

Next, inner mechanisms of the transport arm 36 will be described.

Figure 9:
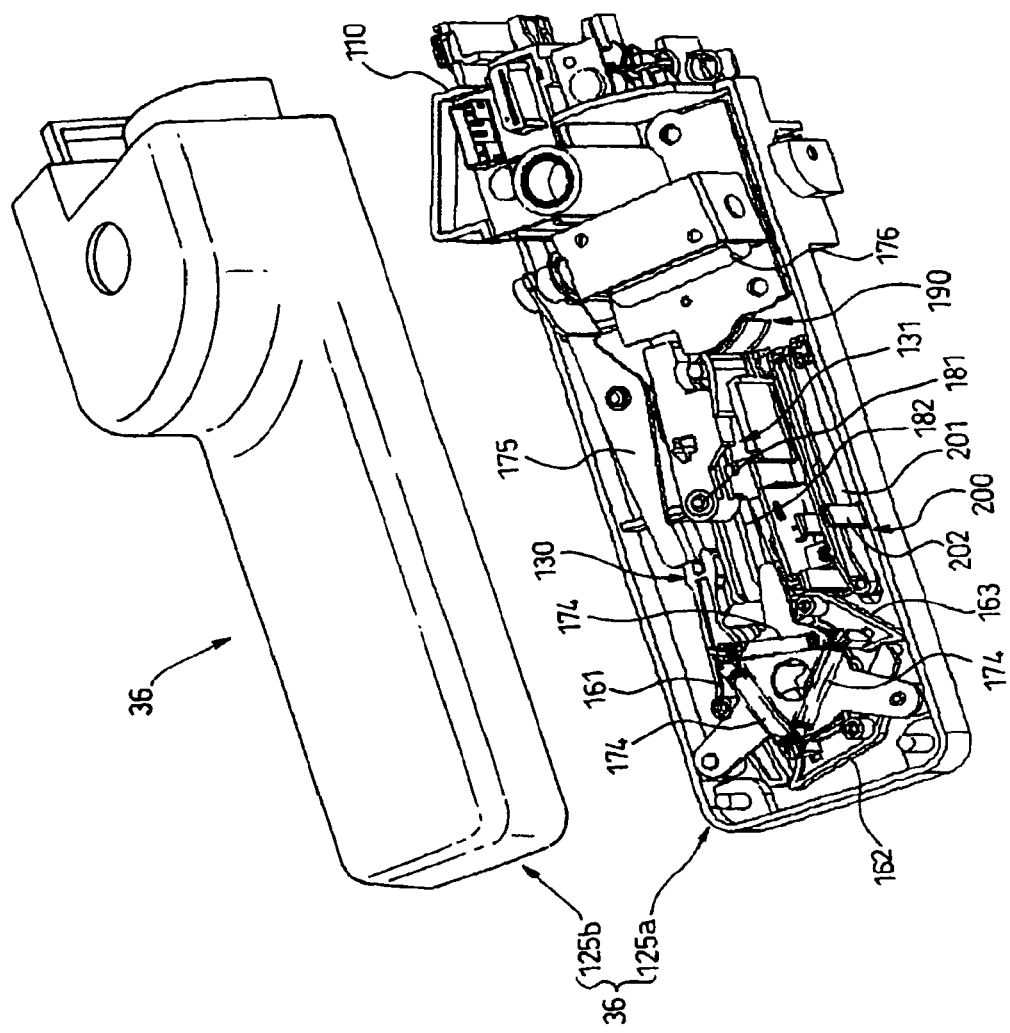
FIG. 9 is a perspective view illustrating an internal structure of the transport arm.

As shown in FIG. 9, the transport arm 36 includes a longitudinal arm base 125a having a rectangular shape in the plan view and an arm case 125b having the same profile as the arm base 125a so as to cover the arm base. The arm base 125a is provided with a holding mechanism 130 for holding a medium M, a separation mechanism 131, and a medium detecting mechanism 200. The holding mechanism 130, the separation mechanism 131, and the medium detecting mechanism 200 are covered with the arm case 125b.

Figure 10:
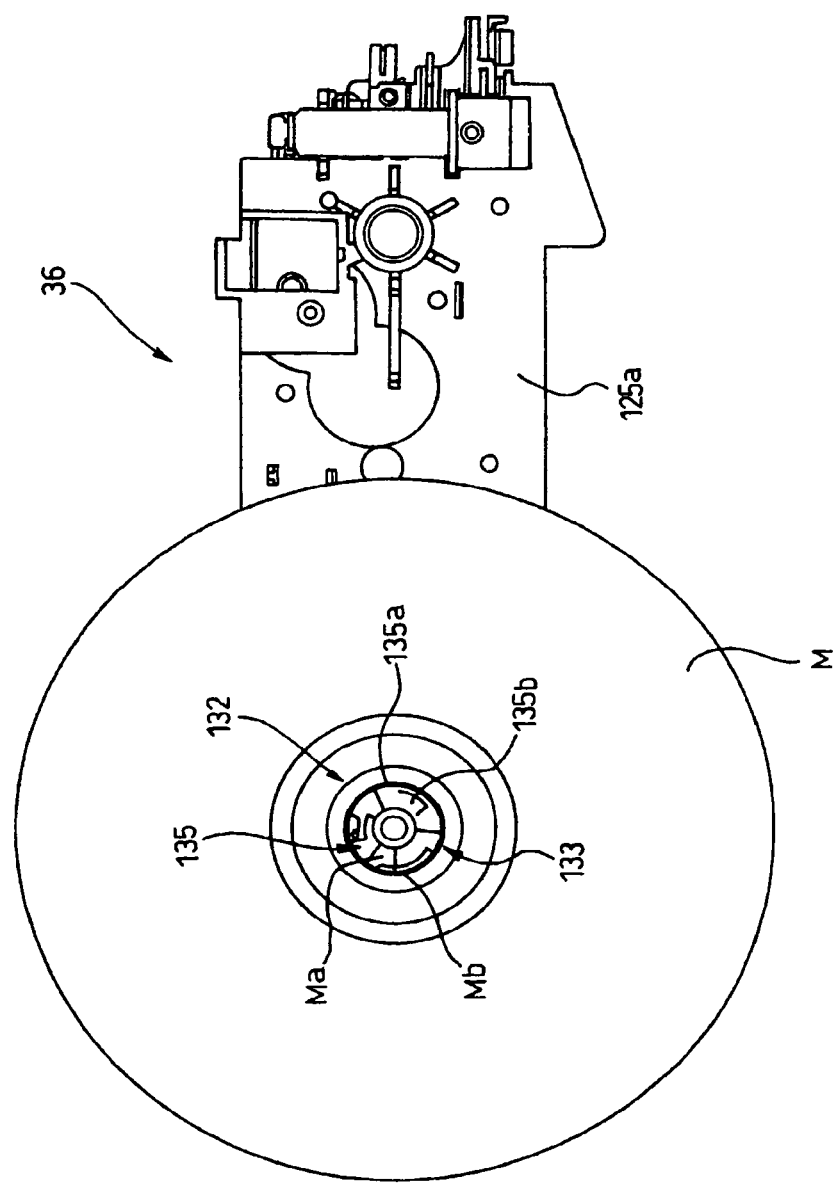
FIG. 10 is a plan view illustrating the transport arm having held a medium as viewed from the bottom.
Figure 11:
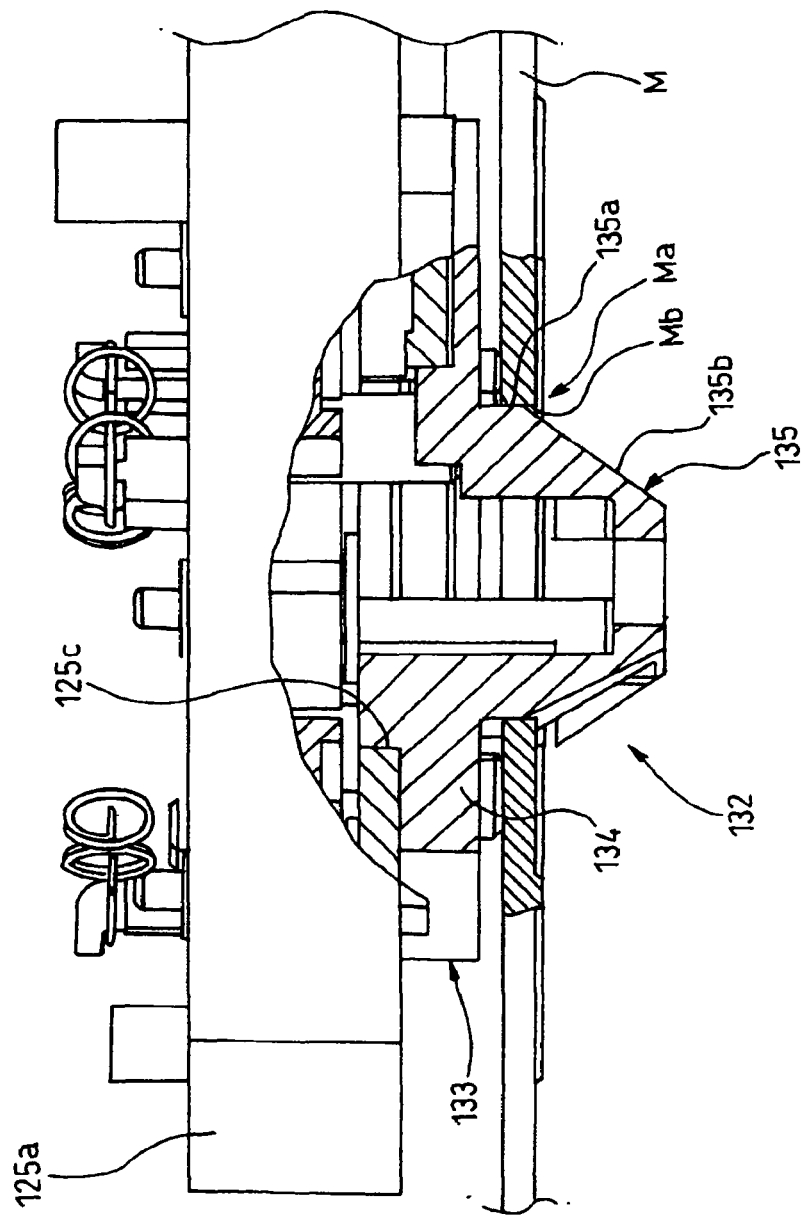
FIG. 11 is a sectional view illustrating a holding portion of the transport arm.

As shown in FIGS. 10 and 11, a bottom portion in the vicinity of the end of the arm base 125a serves as the holding portion 132 for holding a medium M. The medium guide 133 is disposed in the holding portion 132.

Figure 12:
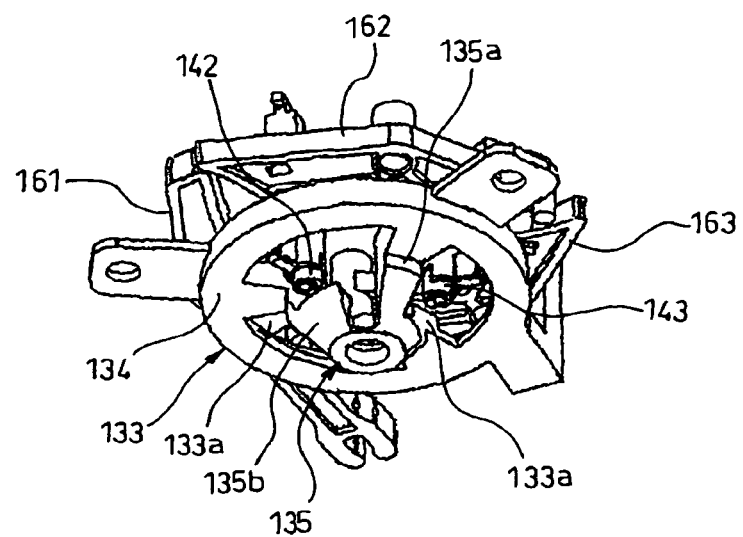
FIG. 12 is a perspective view illustrating a medium guide disposed in the holding portion of the transport arm.
Figure 13:
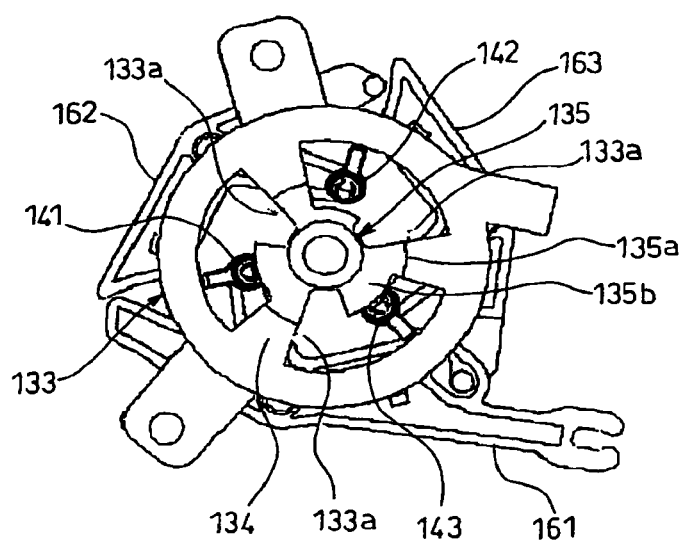
FIG. 13 is a plan view illustrating the medium guide disposed in the holding portion of the transport arm.

As shown in FIGS. 12 and 13, the center of the medium guide 133 corresponds to the pickup center of the medium M and the medium guide has a guide portion 135 protruding downward at the center of a fixed portion 134 fixed to the bottom surface of the arm base 125a. The guide portion 135 has a cylindrical base end 135a formed with a diameter slightly smaller than that of the center hole Ma of the medium M and a guide surface 135b formed in a cone shape that points downward from the base end 135a. The medium guide 133 is inserted into the center hole Ma of the medium M by approaching the medium M, the inner circumferential surface Mb of the center hole Ma of the medium m is guided by the guide surface 135b, the center position of the medium M is aligned with the center position of the medium guide 133 by the guide surface 135b, and then the center hole Ma of the medium M is guided by the base end 135a, whereby the base end 135a is inserted through the center hole of the medium M.

Three window portions 133a are formed in the medium guide 133. Three holding claws 141 to 143 of the holding mechanism 130 and an operation piece 183 of the pressing lever 182 of the separation mechanism 131 can protrude and retreat into and from the window portions 133a.

As shown in FIGS. 12 and 13, the holding mechanism 130 has three cylindrical holding claws 141 to 143 which are disposed at an approximate equiangular interval (120°) on the same circle. The holding claws 141 to 143 protrudes vertically downward from circular hole 125c formed in the arm base 125a and are disposed inside the window portions 133a of the medium guide 133. The three holding claws 141 to 143 are inserted into the center hole Ma of the medium, guided to the base end 135a of the medium guide 133, then are made to move outward, and are made to protrude from the window portions 133a of the medium guide 133, thereby pressing the inner circumferential surface Mb of the center hole Ma of the medium M to hold the medium M.

Figure 20:
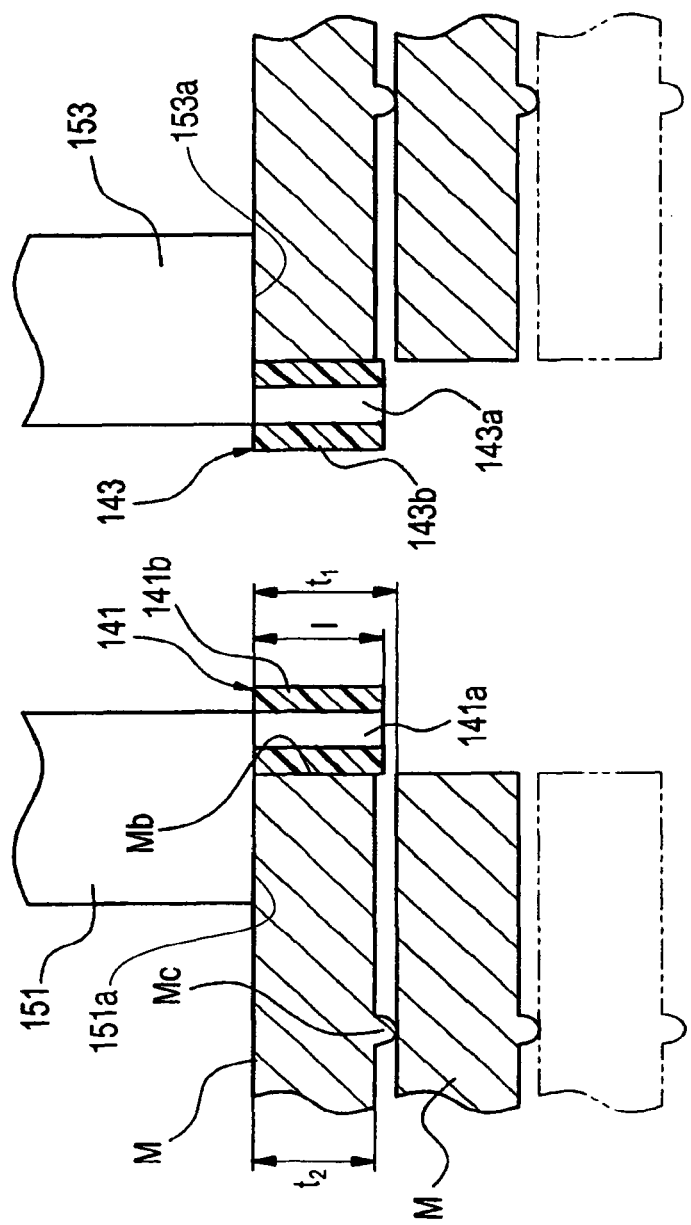
FIG. 20 is a sectional view illustrating the holding claws.

As shown in FIG. 20, the holding claws 141 to 143 are attached to lower ends of supporting pins 151 to 153 having a diameter greater than the holding claws. The supporting pins 151 to 153 extend upwardly through the circular hole 125c of the arm base 125a and three swinging plates 161 to 163 disposed on the top surface of the arm base 125a. Swinging center axes 171 to 173 are vertically fixed to the arm base 125a at the equiangular interval on the same circle so as to surround the circular hole 125c. The swinging plates 161 to 163 are supported to be swingable about the swinging center axes 171 to 173, respectively.

Figure 14:
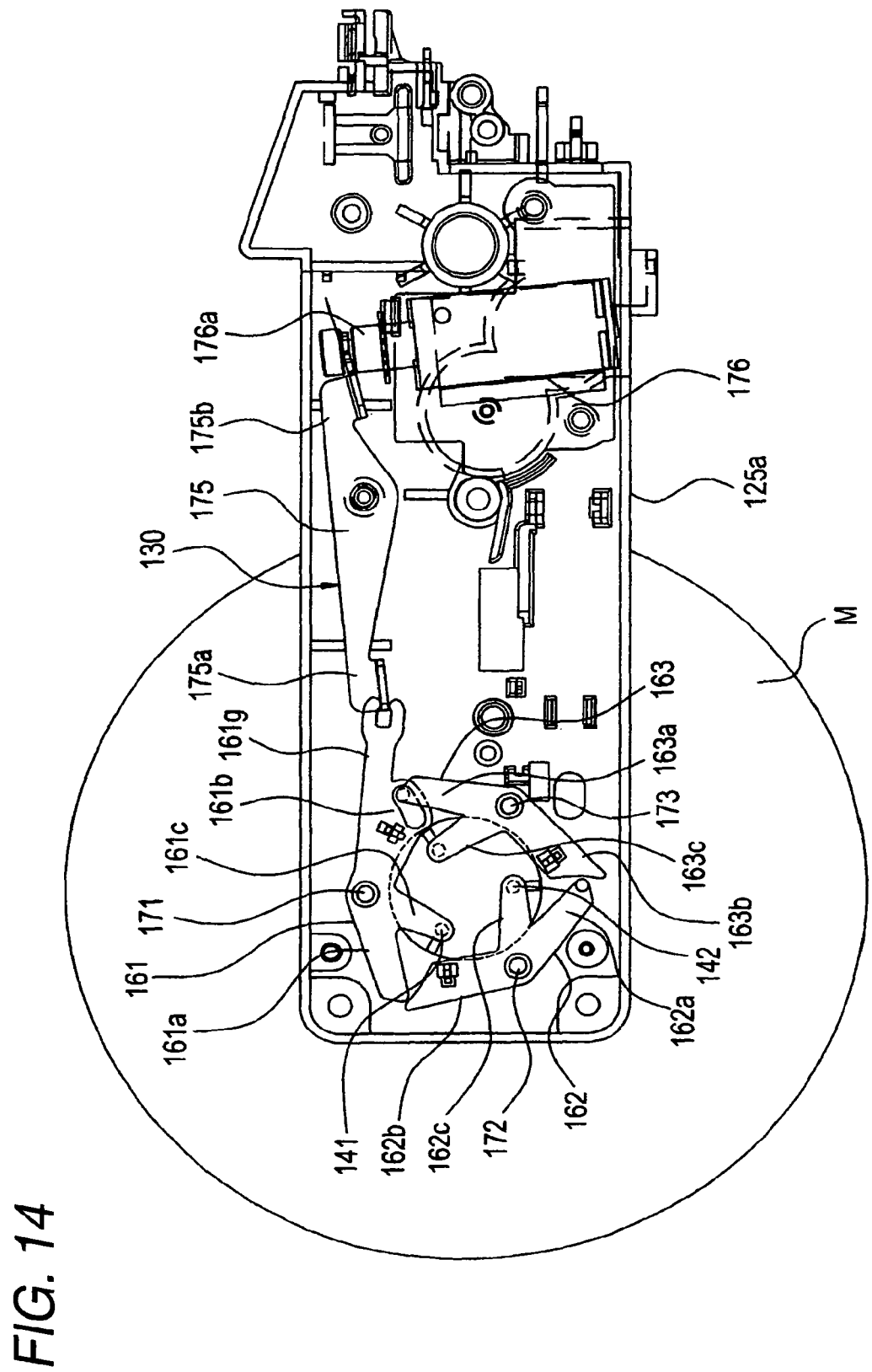
FIG. 14 is a plan view of an arm base which is intended to explain a holding mechanism.
Figure 15:
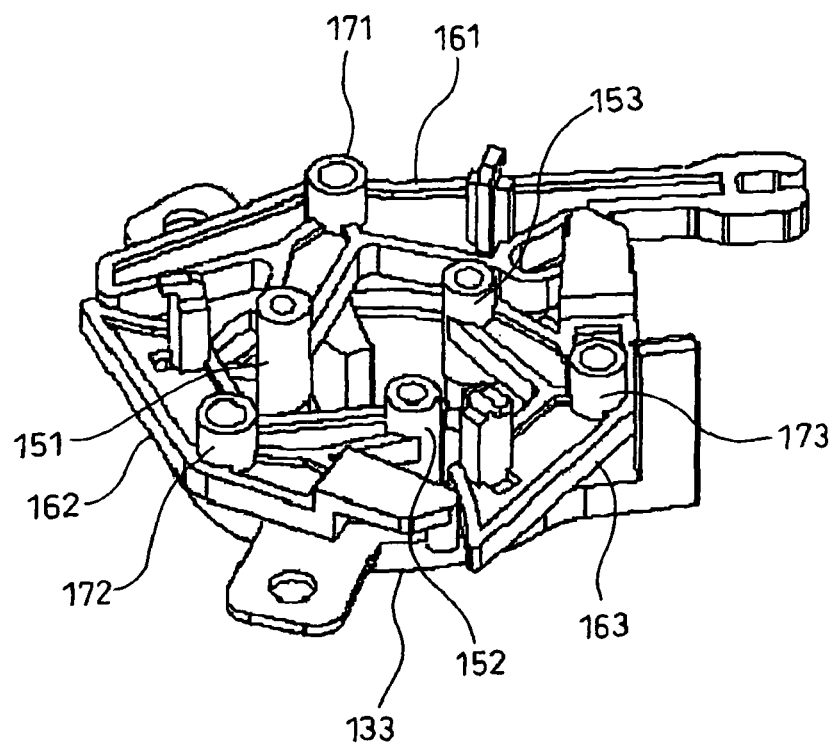
FIG. 15 is a perspective view illustrating holding claws of the holding mechanism.
Figure 16:
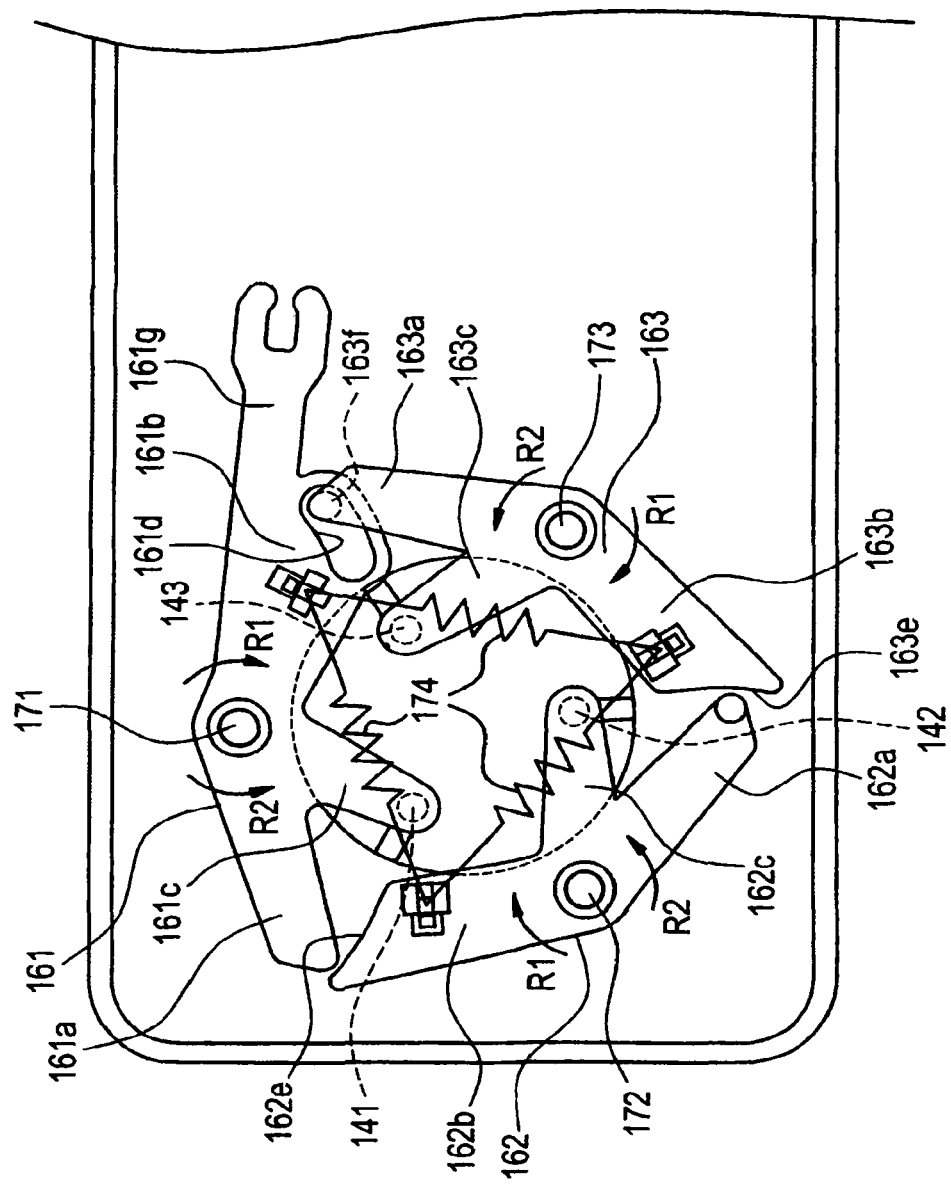
FIG. 16 is an enlarged plan view illustrating the holding claws.

As shown in FIGS. 14 to 16, each swinging plate 161 to 163 includes a front arm portion 161a to 163a extending counterclockwise in the top view, a rear arm portion 161b to 163b extending clockwise in the top view, and supporting arms 161c to 163c protruding inside the center hole 125c from the swinging center, along the arm base 125a from the swinging center axis 171 to 173. The supporting pins 151 to 153 are vertically formed on the rear surface of the ends of the supporting arms 161c to 163c, respectively.

A longitudinal hole 161d in a direction substantially perpendicular to the circular hole 125c is formed in the rear arm portion 161b of the swinging plate 161. A slide pin 163f protruding downward from the rear end of the front arm portion 163a of the swinging plate 163 is slidably inserted through the longitudinal hole 161d.

A slide surface 163e (see FIG. 16) in a direction substantially perpendicular to the circular hole 125c is formed at the end of the rear arm portion 163b of the swinging plate 163 and the front end of the front arm portion 162a of the swinging plate 162 is established so as not to come in contact with the slide surface 163e. A slide surface 162e in the direction substantially perpendicular to the circular hole 125c is formed at the end of the rear arm portion 162b of the swinging plate 162 and the front end of the front arm portion 161a of the swinging plate 161 is in sliding contact with the slide surface 162e. Here, the longitudinal hole 161d of the swinging plate 161 and the slide surfaces 162e and 163e of the swinging plates 162 and 163 are formed in a concave curved shape set to allow the swinging plates 161 to 163 to swing the in same direction.

Tension coil springs (urging members) 174 are suspended between the rear arm portion 161b of the swinging plate 161 and the rear arm portion 162b of the swinging plate 162, between the rear arm portion 162b of the swinging plate 162 and the rear arm portion 163b of the swinging plate 163, and between the rear arm portion 163b of the swinging plate 163 and the rear arm portion 161b of the swinging plate 161. By means of the tension of the tension coil springs 174, the swinging plates 161 to 163 are supported without swinging independently and the urging force, in the direction indicated by arrow R1 in FIG. 16, that is, in the direction in which the holding claws 141 to 143 move outward, is applied to the swinging plates 161 to 163.

In the state shown in FIG. 16, the circumscribed circle of the holding claws 141 to 143 attached to the ends of the supporting arms 161c to 163c of the swinging arms 161 to 163 has a diameter greater than the inner diameter of the center hole Ma of the medium M. In this state, when swinging plate 161 is made to swing in the direction indicated by arrow R2, the other swinging plates 162 and 163 accordingly swing in the same direction as indicated by arrow R2. As a result, the supporting arms 161c to 163c of the swinging plates 161 to 163 move to the center of the circular hole 125c and the holding claws 141 to 143 attached to the ends move inward so that they can be inserted into the center hole Ma of the medium M.

In this state, when the holding claws 141 to 143 are inserted into the center hole Ma of the Medium and then the swinging plates 161 to 163 are made to swing in the opposite direction R1, the holding claws 141 to 143 move outward in the radius direction. As a result, the holding claws 141 to 143 are pressed on the inner circumferential surface Mb of the center hole of the medium M, thereby holding the medium M.

As shown in FIG. 14, an operation arm 161g extending to the opposite side of the supporting arm 161c is formed in the swinging plate 161. The end of one arm portion 175a of a link 175 is rotatably connected to the end of the operation arm 161g. The link 175 is supported by the arm base 125a so as to be rotatable about a middle portion thereof and the end of the opposite arm portion 175b is connected to an operation rod 176a of an electromagnetic solenoid 176. When the electromagnetic solenoid 176 is turned off, the operation rod 176a protrudes by action of the spring force of a built-in spring.

Figure 17:
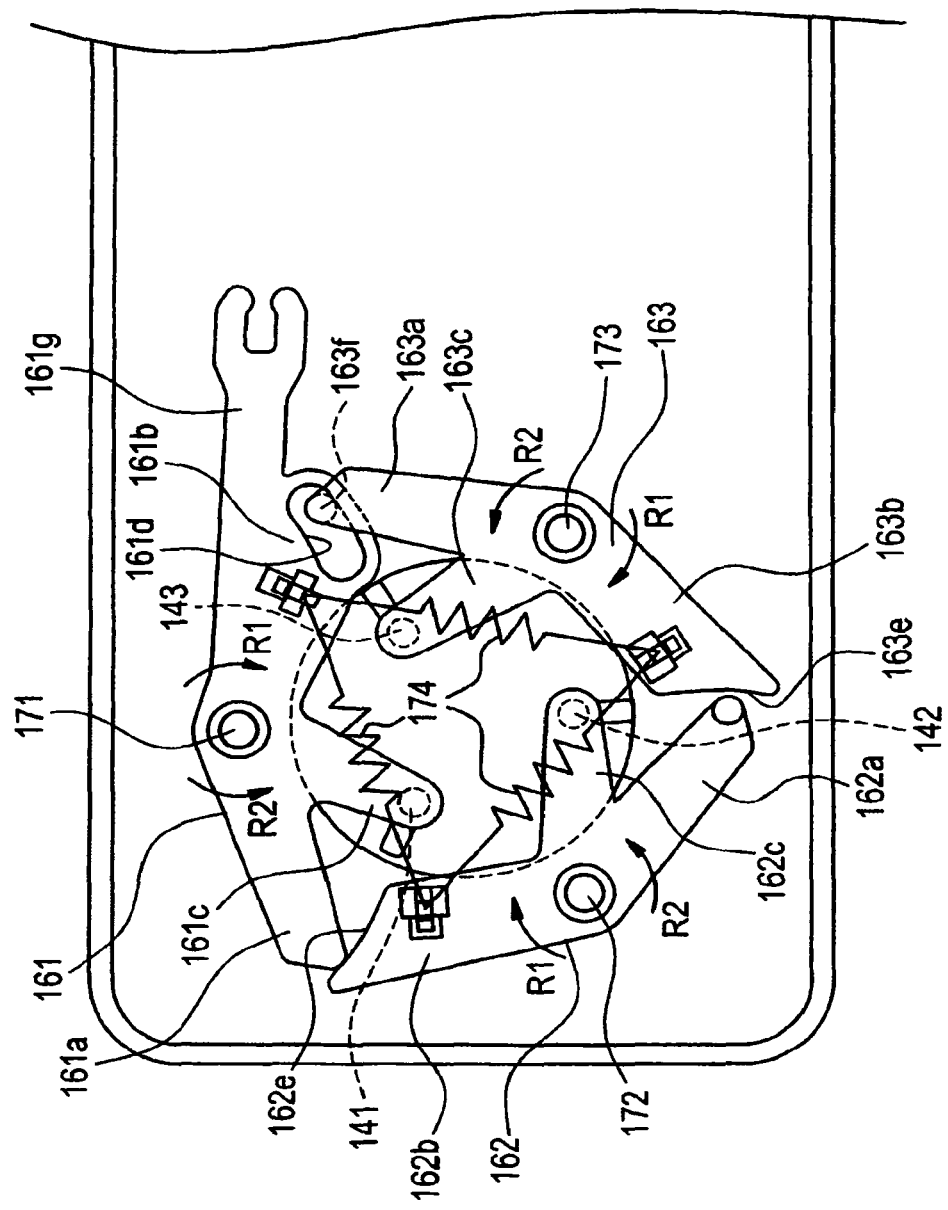
FIG. 17 is a plan view illustrating movements of swinging plates and the holding claws.

In this state, where the electromagnetic solenoid 176 is turned on, the operation rod 176a is reversely inserted against the spring force in the electromagnetic solenoid, the link 175 swings clockwise, and the swinging plate 161 thus swings in the direction of R2. Then, as shown in FIG. 17, the slide surface 162e of the rear arm portion 162b of the swinging plate 162 comes in sliding contact with the end of the front arm portion 161a of the swinging plate 161 and the inner surface of the longitudinal hole 161d of the rear arm portion 161b of the swinging plate 161 comes in sliding contact with the slide pin 163f of the front arm portion 163a of the swinging plate 163. Accordingly, the slide surface 162e of the swinging plate 162 comes in sliding contact with the end of the front arm portion 161a of the swinging plate 161 and slides outward in the diameter direction of the circular hole 125c, whereby the swinging plate 162 swings in the direction of R2. The inner surface of the longitudinal hole 161d of the rear arm portion 161b of the swinging plate 161 comes in sliding contact with the slide pin 163f of the front arm portion 163a of the swinging plate 163 and thus the front arm portion 163a of the swinging plate 163 slides toward the center of the circular hole 125c, whereby the swinging plate 163 also swings in the direction of R2.

Figure 18:
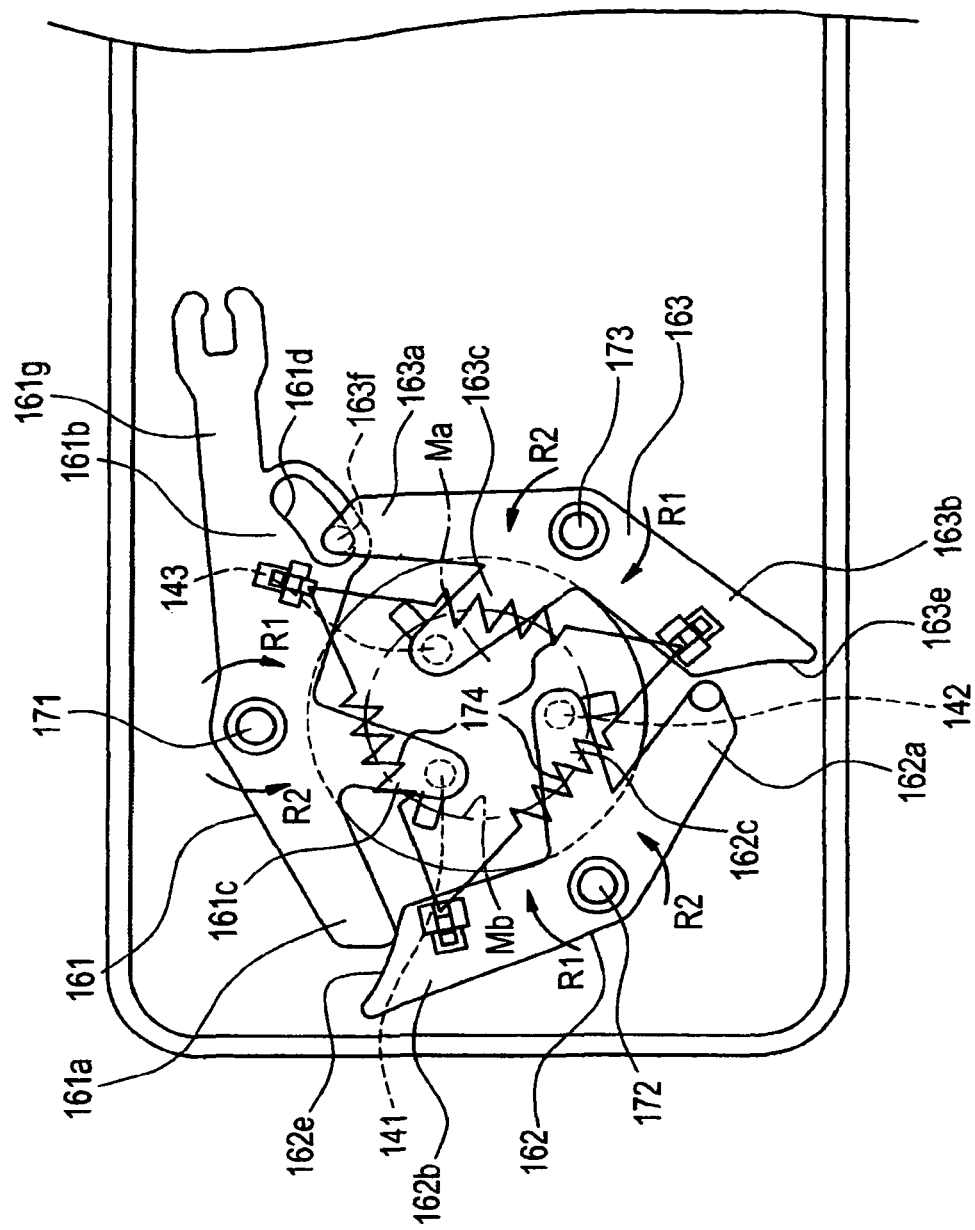
FIG. 18 is a plan view illustrating movements of the swinging plates and the holding claws.

In this way, when the swinging plate 161 swings in the direction of R2, the swinging force in the direction of R2 of the swinging plate 161 is transmitted to the other swinging plates 162 and 163 and thus the swinging plates 162 and 163 also swing in the direction of R2, as shown in FIG. 18. The holding claws 141 to 143 disposed in the supporting arms 161c to 163c of the swinging plates 161 to 163 are disposed in the circumscribed circle sufficiently smaller than the center hole Ma of the medium M and move inward until it can be inserted into the center hole Ma of the medium M.

Figure 19:
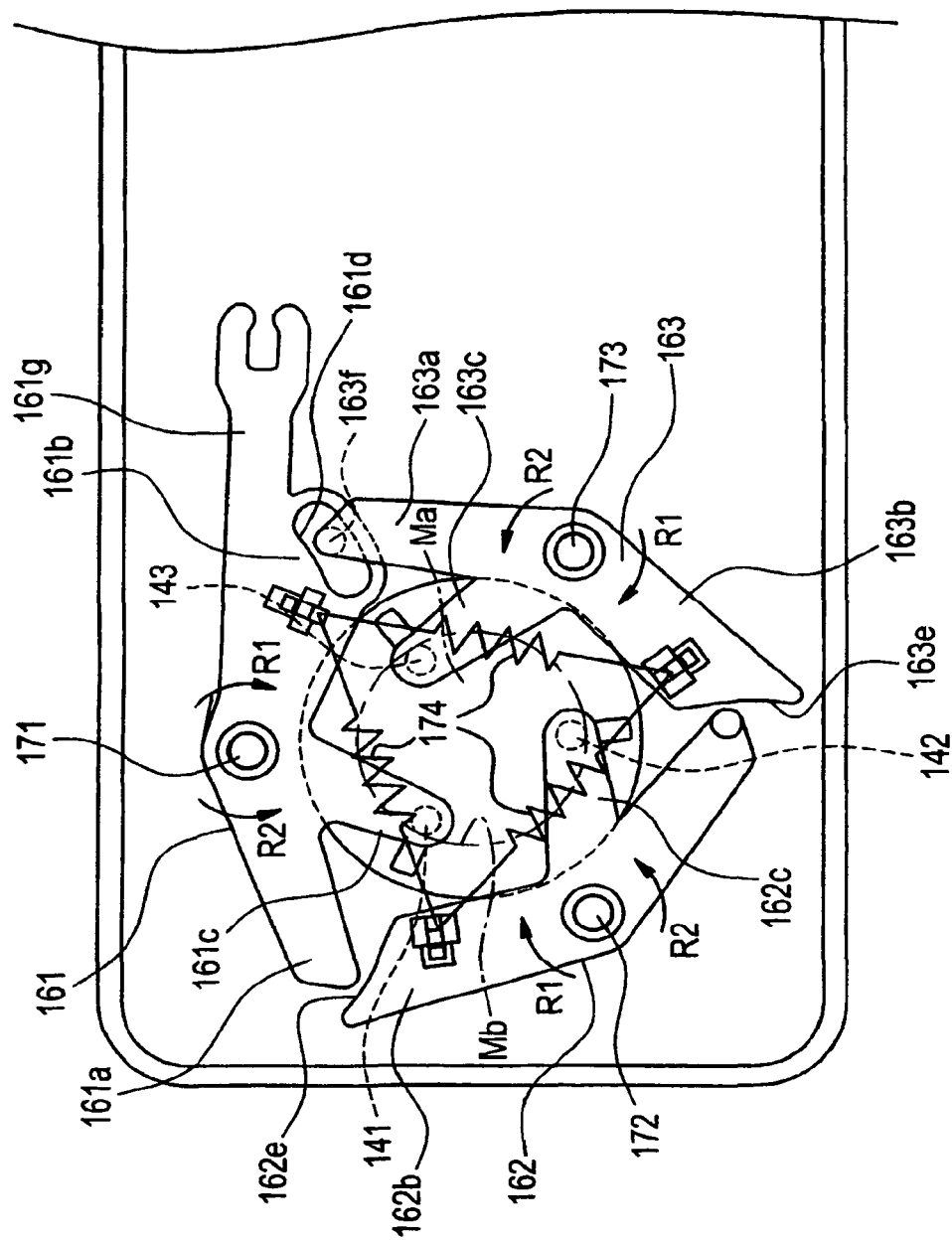
FIG. 19 is a plan view illustrating movements of the swinging plates and the holding claws.

In this state, when the electromagnetic solenoid 176 is turned off, the operation rod 176a is made to protrude by means of the spring force of the spring in the electromagnetic solenoid and the tension coil spring 174 and the link 175 thus swings. Then, the swinging motion of the link 175 is transmitted to the swinging plate 161 and thus the swinging plate 161 swings in the direction of R1. Accordingly, in the other swinging plates 162 and 163, the rear arm portions 162b and 163b move toward the center of the circular hole 125c by means of the tension of the tension coil spring 174 and thus the swinging plates 162 and 163 also swing in the direction of R1 like the swinging plate 161. As a result, as shown in FIG. 19, the holding claws 141 to 143 move outward and the holding claws 141 to 143 are pressed on the inner circumferential surface Mb of the center hole Ma of the medium M, thereby holding the medium M.

At this time, since the swinging plates 162 and 163 swing in the direction of R1 by means of the tension of the tension coil spring 174 independently of the swinging plate 161, the holding claws 141 to 143 move outward in the radius direction independently of each other and thus are pressed on the inner circumferential surface Mb of the center hole Ma of the medium M.

As shown in FIG. 20, each of three holding claws 141 to 143 includes a cylindrical pin 141a to 143a protruding form the bottom end of the supporting pin 151 to 153 and an elastic cylinder 141b to 143b made of rubber to surround the pin 141a to 143a concentrically. Here, although the cylindrical pin 142a and the elastic cylinder 142b are not shown in FIG. 20, these components are provided with the holding claw 142 in a similar configuration as the holding claws 141 and 143. In the holding claws 141 to 143, the downward protruding length l is equal to or smaller than the thickness t1 of the medium M to be held. It is preferable that the producing length l is equal to or greater than the thickness t2 of the inner circumferential surface Mb of the center hole Ma of the medium M and equal to or smaller than the thickness t1 of the medium M including the height of a ring-shaped protrusion Mc. Accordingly, when the mediums M stacked in the thickness direction are held, the holding claws 141 to 143 hold only the uppermost medium M without coming in contact with the inner circumferential surface Mb of the second medium M. The portions of the supporting pins 151 to 153 close to the holding claws 141 to 143 are contact surfaces 151a to 151b with the medium Mm to be held.

Figure 21:
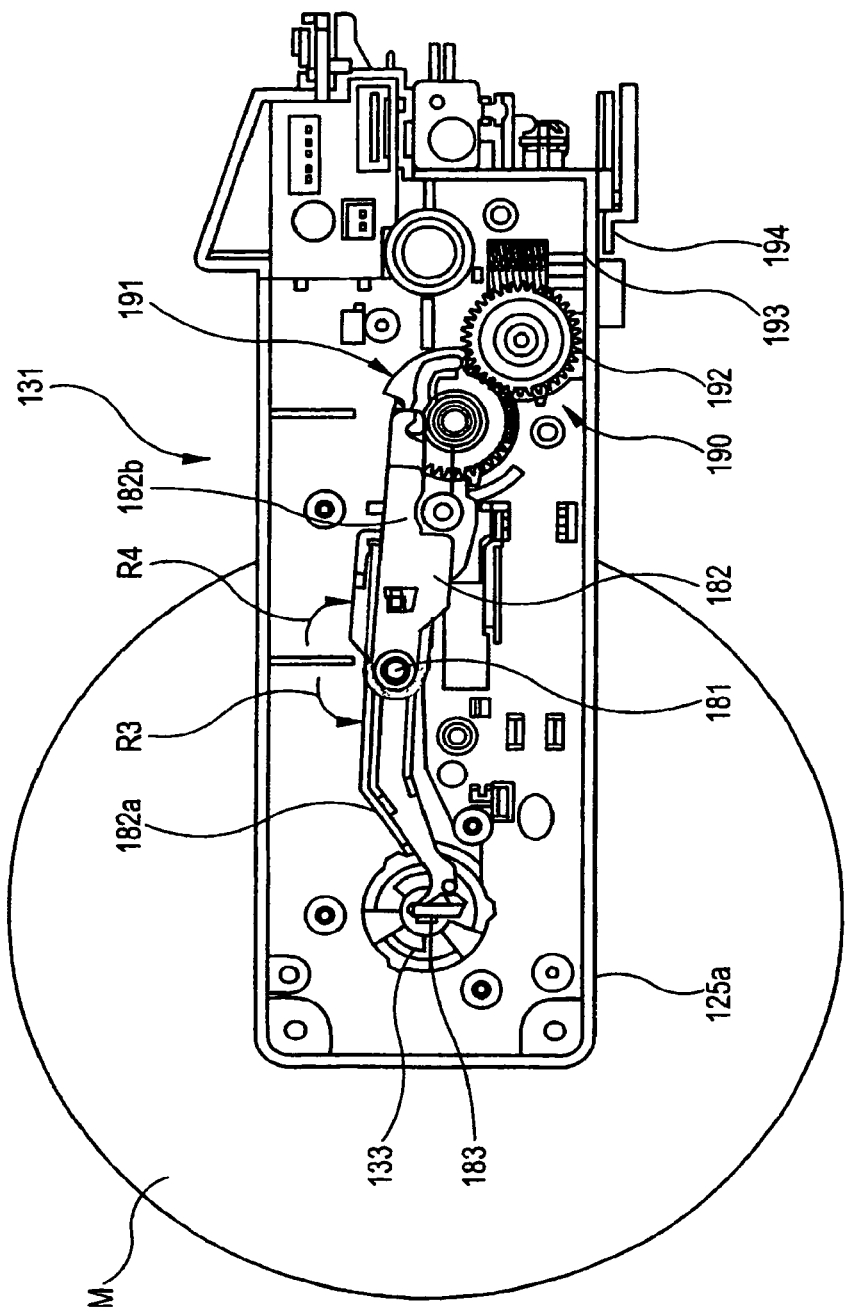
FIG. 21 is a plan view of an arm base which is intended to explain a separation mechanism.
Figure 22:
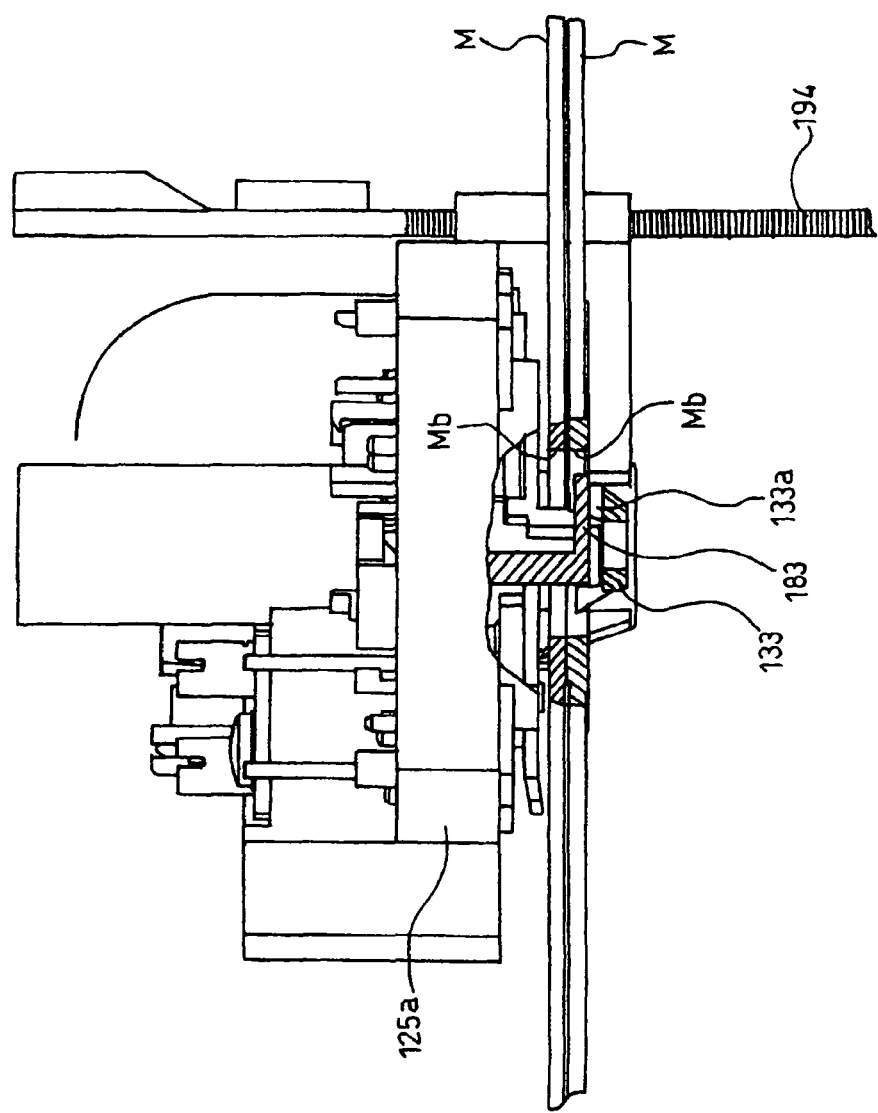
FIG. 22 is a front view illustrating the transport arm when the holding portion is viewed in a section.
Figure 23:
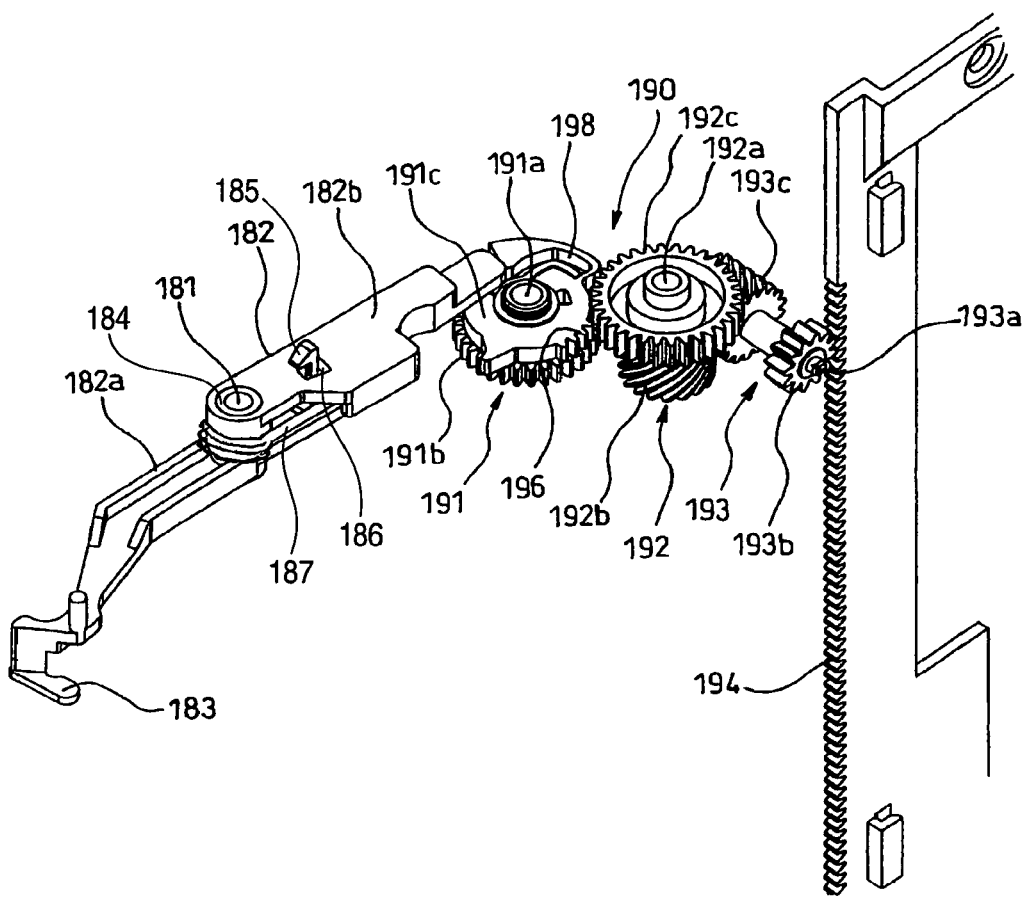
FIG. 23 is a perspective view illustrating the separation mechanism.
Figure 26:
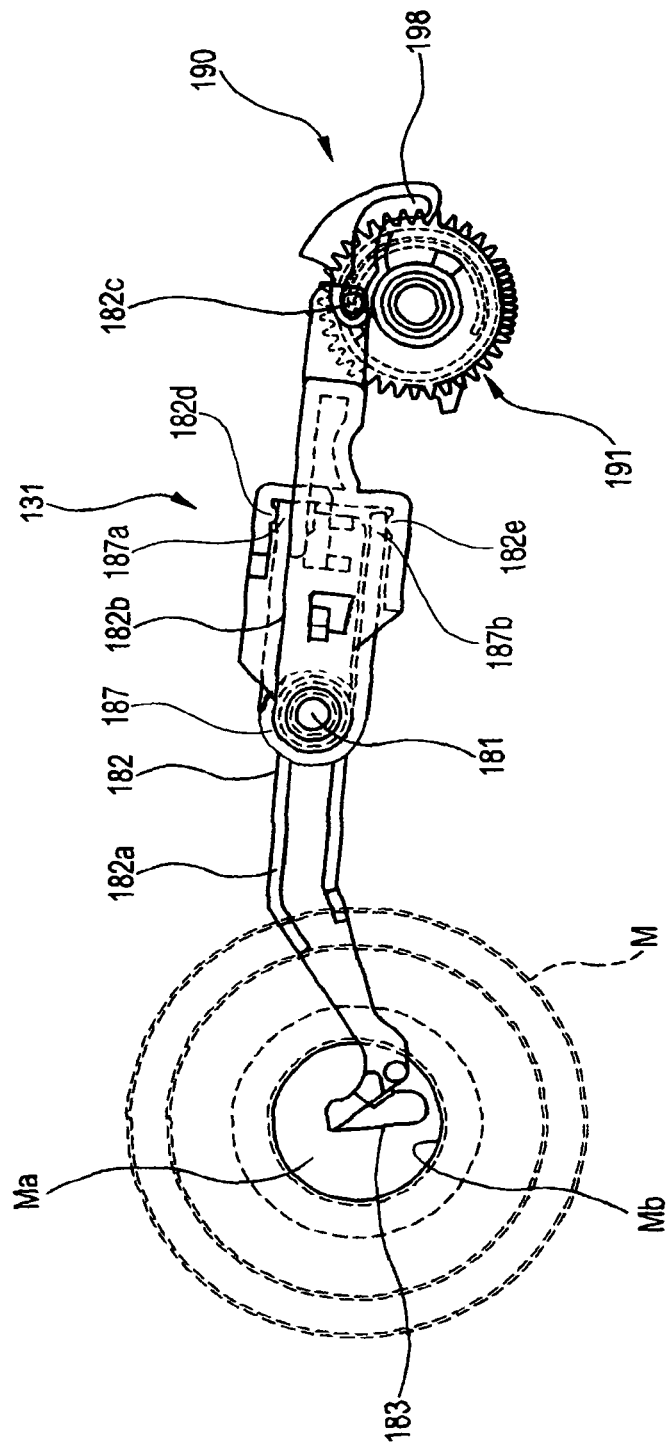
FIG. 26 is a plan view schematically illustrating the movement of the separation mechanism.

As shown in FIGS. 21 to 23, the separation mechanism 131 disposed in the arm base 125a of the transport arm 36 includes a pressing lever 182 that is rotatably supported by a support shaft 181 formed in the arm base 125a. The pressing lever 182 includes two components of a front lever portion 182a on the holding side and a rear lever portion 182b on the rotation side. In the front lever portion 182a, a cylindrical bearing portion 184 inserted through the support shaft 181 formed in the arm base 125a is made to protrude upward and the rear lever portion 182b is swingably supported by the bearing portion 184. The front lever portion 182a and the rear lever portion 182b are swingable in a predetermined range by a locking portion 185 which is prevented from being separated from the front lever portion 182a and an opening 186 having a width greater than the width of the locking portion 185 and being disposed in the rear lever portion 182b. As shown in FIGS. 23 and 26, the front lever portion 182a and the rear lever portion 182b are urged in a direction by a buffer spring 187 which is a twist coil spring. Specifically speaking, in the buffer spring 187 attached to the outer circumference of the swinging portion of the rear lever portion 182b, one arm portion 187a urges a receiving portion 182d of the front lever portion 182a and the other arm portion 187b urges a receiving portion 182e of the rear lever portion 182b so as to be apart from each other. Accordingly, in the pressing lever 182, a great load is applied to an operation piece 183 to be described later when the rear lever portion 182b allows the front lever portion 182a to swing, and the buffer spring 187 is bent when the front lever portion 182a cannot swing, thereby preventing the damage of the operation piece 183. The front lever portion 182a has the operation piece 183 bent from the front end to the down side and laterally bent in an L shape. The operation piece 183 is disposed in the medium guide 133 of the holding portion 132.

In a state where the holding claws 141 to 143 of the holding portion 132 hold the medium M, the operation piece 183 of the pressing lever 182 is disposed horizontal below the medium M. Specifically, the operation piece is disposed at a position corresponding to the second medium M of the mediums stacked in the thickness direction.

When the pressing lever 182 swings at the connection point 181 in the direction of R3 in FIG. 21, the operation piece 183 protrudes laterally from the window portion 133a of the medium guide 133 and comes in pressing contact with the inner circumferential surface Mb of the center hole Ma of the second medium M just below the uppermost medium M held by the holding claws 141 to 143. When the pressing lever 182 swings in the opposite direction of R4 in this state, the operation piece 183 is inserted into the medium guide 133.

A swing mechanism 190 for allowing the pressing lever 182 to swing is disposed in the rear lever portion 182b of the pressing lever 182. The swing mechanism 190 includes a complex clutch gear 191, a vertical complex transmission gear 192, a horizontal complex transmission gear 193, and a lock 194.

As shown in FIG. 5, the lock 194 is vertically supported by the chassis 32 constituting the medium transporting unit 31 so as to be parallel to the vertical guide shaft 35. The lock 194 engages with a pinion 193*b* of the horizontal complex transmission gear 193 supported by the arm base 125*a* so as to be rotatable about a horizontal shaft 193*a* (see FIG. 23). By lifting up and down the transport arm 36, the horizontal complex transmission gear 193, which has the pinion 193*b* that engages with the lock 194, rotates.

A screw gear 193*c* is disposed in the horizontal complex transmission gear 193. The screw gear 193*c* engages with a screw gear 192*b* of the vertical complex transmission gear 192 supported by the arm base 125*a* so as to be rotatable about a vertical shaft 192*a*. Accordingly, when the horizontal complex transmission gear 193 rotates, the rotation of the horizontal complex transmission gear 193 having the horizontal shaft 193*a* is transmitted to the vertical complex transmission gear 192 having the vertical shaft 192*a* through the screw gears 192*b* and 193*c* engaging with each other, thereby allowing the vertical complex transmission gear 192 to rotate.

The vertical complex transmission gear 192 includes a horizontal gear 192*c*. The horizontal gear 192*c* engages with a horizontal gear 191*b* of the complex clutch gear 191 supported by the arm base 125*a* so as to be rotatable about the vertical shaft 191*a*. Accordingly, when the vertical complex transmission gear 192 rotates, the rotating force of the vertical complex transmission gear 192 is transmitted to the complex clutch gear 191 through the horizontal gears 191*b* and 192*c* engaging with each other, thereby allowing the complex clutch gear 191 to rotate.

Figure 24:
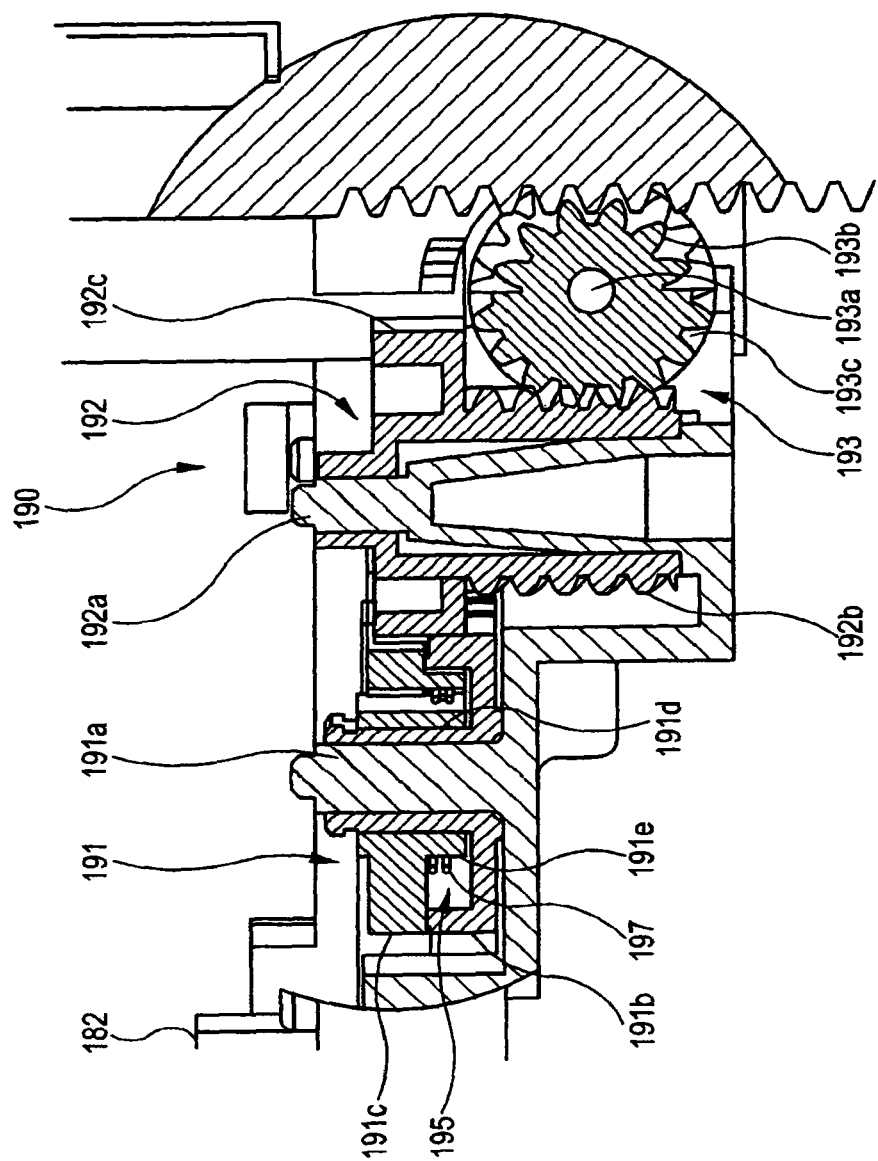
FIG. 24 is a sectional view illustrating a swinging mechanism disposed in the separation mechanism.
Figure 25:
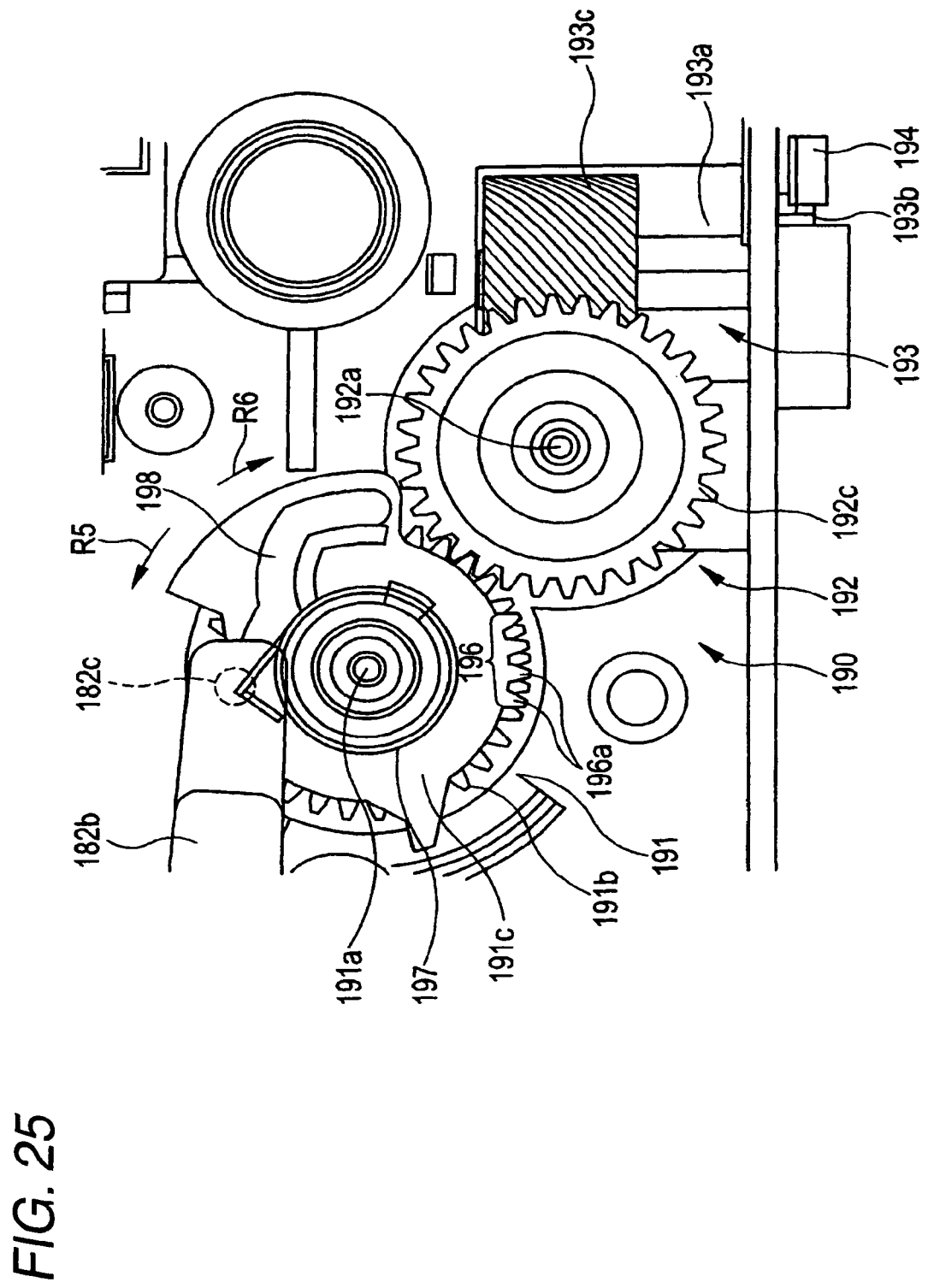
FIG. 25 is a plan view illustrating the swinging mechanism disposed in the separation mechanism.

As shown in FIGS. 24 and 25, the complex clutch gear 191 includes an intermittent gear 191*c* that is rotatable relative to the horizontal gear 191*b*. A clutch mechanism 195 is disposed between the horizontal gear 191*b* and the intermittent gear 191*c*. The horizontal gear 191*b* has a cylinder shaft 191*d* through which the shaft 191*a* is inserted. The cylinder shaft 191*d* is inserted through a cylinder shaft 191*e* formed in the intermittent gear 191*c*.

As shown in FIG. 25, the intermittent gear 191*c* has a gear train 196 including plural gears 196*a* on a part of the circumferential surface. The gear train 196 can engage with the horizontal gear 192*c* of the vertical complex transmission gear 192.

The clutch mechanism 195 disposed in the complex clutch gear 191 has a twist coil spring 197 wound on the cylinder shaft 191*e* of the intermittent gear 191*c*. When the horizontal gear 191*b* is made to rotate in the counterclockwise direction of R5 as viewed from the upside in FIG. 25 by the horizontal gear 192*c* of the vertical complex transmission gear 192, the intermittent gear 191*c* is made to rotate with the horizontal gear 191*b* by the frictional force generated from the twist coil spring 197. Accordingly, the gear train 196 engages with the horizontal gear 192*c* of the vertical complex transmission gear 192 and thus the intermittent gear 191*c* rotates in the direction of R5 along with the horizontal gear 191*b*. On the contrary, when the horizontal gear 191*b* is made to rotate in the clockwise direction of R6 as viewed from the upside in FIG. 25 by the horizontal gear 192*c* of the vertical complex transmission gear 192, the intermittent gear 191*c* is made to rotate along with the horizontal gear 191*b* by means of the frictional force generated from the twist coil spring 197. Accordingly, the gear train 196 engages with the horizontal gear 192*c* of the vertical complex transmission gear 192 and thus the intermittent gear 191*c* rotates in the direction of R6 along with the horizontal gear 191*b*.

Figure 27:
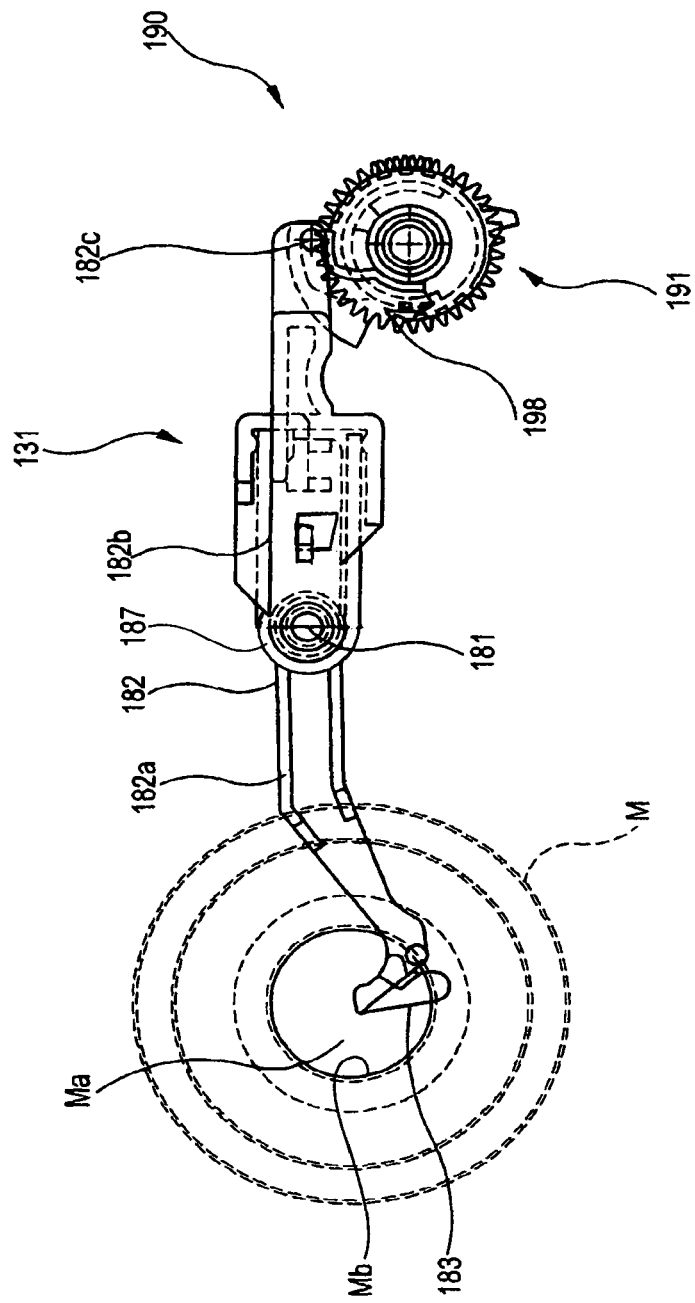
FIG. 27 is a plan view schematically illustrating the movement of the separation mechanism.

A cam hole 198 is formed in the intermittent gear 191*c*. A cam pin 182*c* protruding downward from the vicinity of the rear end of the rear lever portion 182*b* of the pressing lever 182 is slidably disposed in the cam hole 198. The cam hole 198 has a path changing from the center to the outer circumference in the clockwise direction in the top view. Accordingly, when the intermittent gear 191*c* rotates in the counterclockwise direction of R5 in the top view in the state shown in FIG. 26, the cam pin 182*c* in the cam hole 198 is displaced to the outer circumference. Accordingly, as shown in FIG. 27, the pressing lever 182 swings in the direction of R3 about a connection point 181 and thus the operation piece 183 protrudes to the outside of the medium guide 133. In this state, when the intermittent gear 191*c* rotates in the clockwise direction of R6 in the top view, the cam pin 182*c* in the cam hole 198 is displaced to the inner circumference. Accordingly, as shown in FIG. 26, the pressing lever 182 swings about the connection point 181 in the direction of R4 and thus the operation piece 183 is inserted into the medium guide 133.

In the separation mechanism 131 having the above-mentioned configuration, when the transport arm 36 starts going up, the complex clutch gear 191 starts rotating in the direction of R5. When the transport arm 36 further goes up and the complex clutch gear 191 rotates by a predetermined angle (about 45°) from the state shown in FIG. 26 to the state shown in FIG. 27, the pressing lever 182 swings in the direction of R3 (see FIG. 21) and thus the operation piece 183 of the pressing lever 182 separates the second medium M in the meantime. When the transport arm 36 goes down, the complex clutch gear 191 rotates in the direction of R6. Accordingly, the pressing lever 182 rotates in the direction of R4 (see FIG. 21) and the operation piece 183 is inserted into the medium guide 133 as shown in FIG. 26. Even when the transport arm 36 goes down in this state, the gear train 196 runs off from the horizontal gear 192*c* after the intermittent gear 191*c* of the complex clutch gear 191 rotates by a predetermined angle (about 45°) in the direction of R6 (see FIG. 26) by the horizontal gear 192*c* of the vertical complex transmission gear 192 and thus the intermittent gear idly rotates relative to the horizontal gear 191*b*.

As shown in FIG. 9, the medium detecting mechanism 200 includes a detection lever 201 of which the rear end is swingably supported and the front end is bent downward to protrude toward the bottom surface of the arm base 125*a* and a detector 202 disposed aside the detection lever 201. In the medium detecting mechanism 200, when the transport arm 36 goes down to bring the top surface of the medium M into contact with the detection lever 201 and thus the detection lever 201 swings upward to allow the detection lever 201 to depart from the detection area of the detector 202, the detector 202 is turned on and thus it is possible to detect an approaching state to the medium M from the detection signal output from the detector 202.

Next, an operation of picking up a medium M in the medium transporting unit 31 having the above-mentioned configuration will be described.

Figure 29:
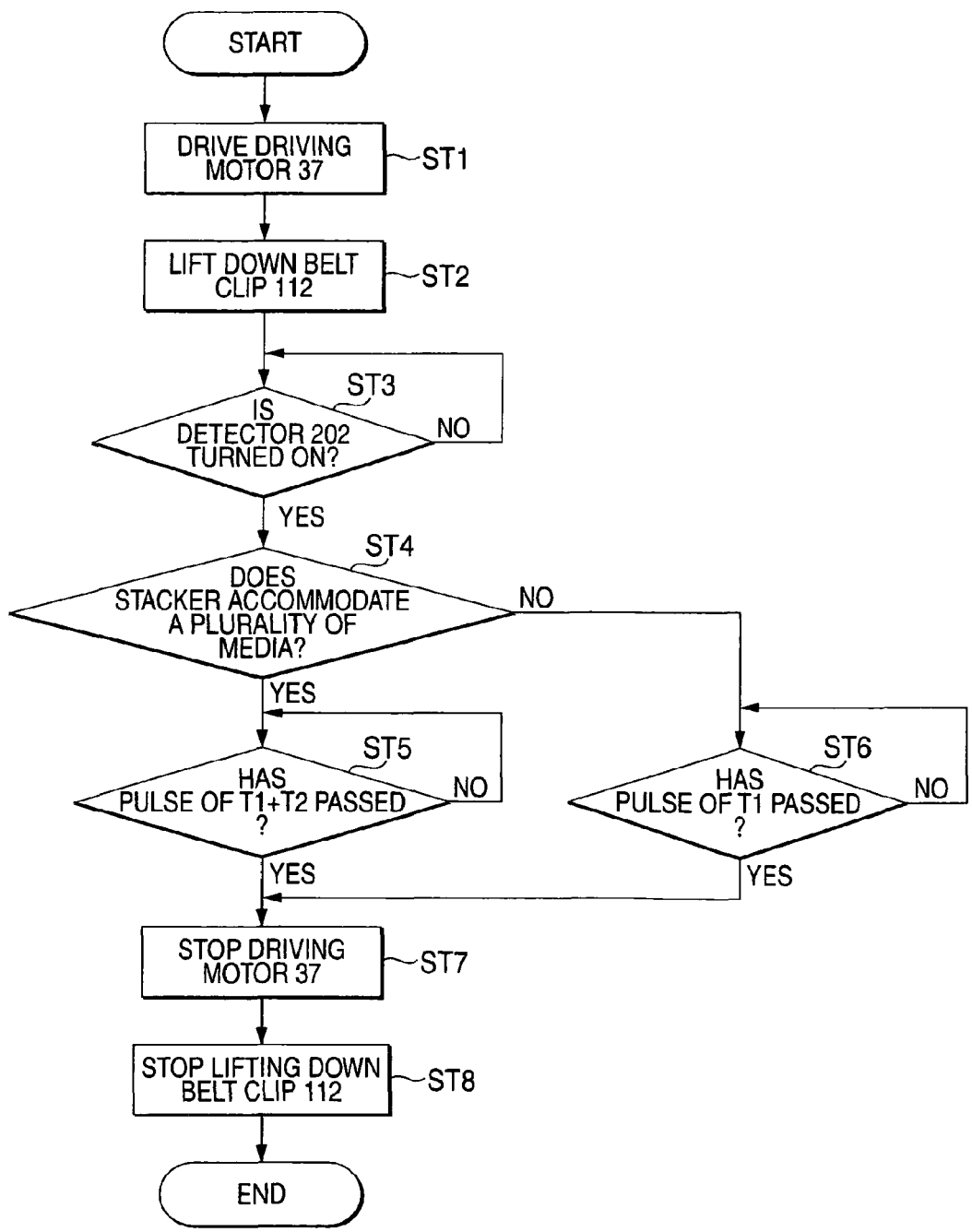
FIG. 29 is a flowchart illustrating a process of controlling a driving motor for lifting up and down the transport arm.

An example where the uppermost medium M of the mediums M stacked is held and picked up from the blank medium stacker 21 will be described with reference to the flowchart of controlling the lifting driving motor of the transport arm, which is shown in FIG. 29.

First, in a state where the transport arm 36 is located at a predetermined height position just above the blank medium stacker 21, the electromagnetic solenoid 176 of the holding mechanism 130 is turned on. In this state, the operation rod 176*a* of the electromagnetic solenoid 176 is inserted against the built-in spring, this movement is transmitted to the swinging plate 161 through the link 175, and the swinging plate 161 swings in the direction of R2 in FIG. 16. Accordingly, the other swinging plates 162 and 163 swing in the same direction and the holding claws 141 to 143 attached to the ends of the supporting arms 161c to 163c of three swinging plates 161 to 163 moves close to each other, whereby it gets pointed so as to be inserted into the center hole Ma of the medium M.

Thereafter, the lifting driving motor 37 of the transport arm 36 is driven (ST1) and the belt clip 112 fixed to the timing belt 104 goes down (ST2), thereby starting the lift-down operation of the transport arm 36. When the transport arm 36 is lifted down and gets close to the uppermost medium M, the medium guide 133 of the holding portion 132 is inserted into the center hole Ma of the medium M. Here, even when the center of the medium M in the blank medium stacker 21 runs off from the center of the holding portion 132, the inner circumferential surface Mb of the center hole Ma of the medium M comes in contact with the conical guide surface 135b, the center position of the medium M is thus aligned with the center position of the medium guide 133 by the guide surface 135b, the center hole Ma of the medium M is guided to the base end 135a, and thus the base end 135a is inserted through the center hole Ma of the medium M. That is, the center of the medium M to be held is positioned at the center of the holding portion 132 which is the pickup center.

At this time, when the end of the detection lever 201 of the medium detecting mechanism 200 mounted on the transport arm 36 comes in contact with the surface of the medium M, the detection lever 201 swings upward with the lift-down of the transport arm 36 and the detection lever 201 runs off from the detection area of the detector 202, thereby turning on the detector 202 (ST3) to detect the access state to the medium M. It is determined whether the destination of the transport arm 36 is the blank medium stacker 21 receiving plural mediums stacked therein or the medium tray 51 or the medium tray 41a receiving a single medium (ST4). When the destination is the medium trays 41a and 51 of the drive and the printer, the driving motor is driven separately (ST5) by adding pulse T2 to pulse T1 applied to the driving motor 37, the driving motor is stopped (ST7) by lifting down the transport arm 36 by a predetermined distance, and the holding claws 141 to 143 of the holding mechanism 130 mounted on the transport arm 36 are inserted into the center hole Ma of the medium M.

The mediums M are stacked in the blank medium stacker 21. Since the stacked mediums M are in close contact with each other, an adhesive force may occur between the mediums M.

Accordingly, when the second medium M is adhered to the uppermost medium M, it is difficult to horizontally position the uppermost medium only by bringing the holding claws 141 to 143 into contact with the inner circumferential surface Mb of the center hole Ma of the medium.

Accordingly, in the medium transporting unit 31, by applying a predetermined pressing force to the uppermost medium M from the top, the pressing force toward the lateral end of the medium M is applied by the guide surface 135b of the medium guide 133, thereby satisfactorily moving and positioning the medium M laterally.

A relation between a position of the belt clip 112 of the transport arm 36 and a load on the medium M will be described.

Figure 28:
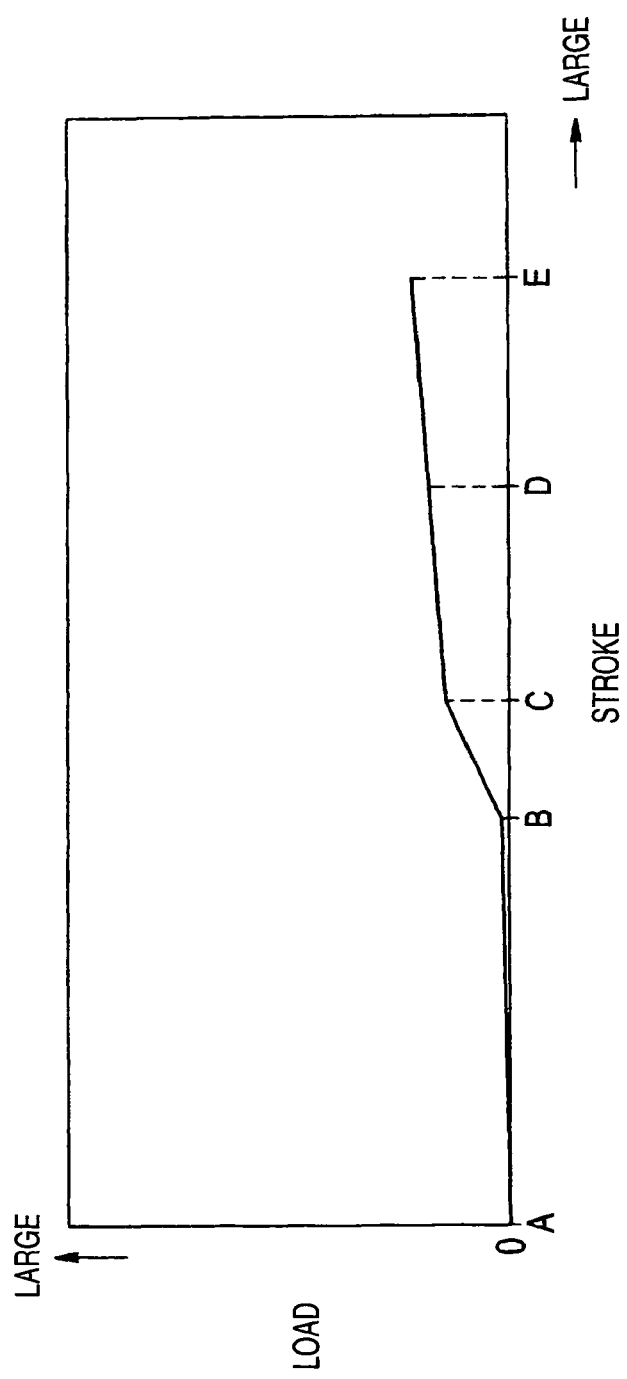
FIG. 28 is a graph illustrating a relation between a down stroke of a belt clip of the transport arm and a load acting on a medium.

FIG. 28 is a graph illustrating a relation between a down stroke of the belt clip of the transport arm and a load on the medium.

First, in a state where the holding portion of the transport arm 36 is in contact with the uppermost medium M (a state between A and B in FIG. 28), when the driving motor 37 continues driving by further applying pulse T2 (ST5), the belt clip 112 fixed to the timing belt 104 is lifted down against the urging force of the first tension spring 113 having a small spring force, the belt clip 112 goes down by a distance corresponding to the clearance S, and then the belt clip 112 comes in contact with the pressing lever 116 (state B in FIG. 28). Accordingly, until the belt clip 112 comes in contact with the pressing lever 116 after the holding portion 132 comes in contact with the uppermost medium, the first elastic pressing force including the urging force of the first tension spring 113 having the small spring force is applied to the uppermost medium M (state between A and B in FIG. 28).

When the driving motor 37 is further driven, the belt clip 112 further goes down. At this time, since the belt clip 112 is in contact with the pressing lever 116, the lift-down force of the belt clip 112 is transmitted to the transport arm 36 to bend the transporting arm 36 and the bending force is applied as a pressing force to the uppermost medium M (state between B and C in FIG. 28).

When the driving motor 37 is further driven (ST5), the belt clip 112 goes down and stops (ST7 and ST8), and thus the bending force of the transport arm 36 is greater than the urging force of the second tension spring 119 having a great spring force (state C in FIG. 28), the pressing lever 116 swings about a supporting point on the supporting plate 117 against the urging force of the second tension spring 119. Accordingly, the second elastic pressing force obtained by adding the urging force of the second tension spring 119 to the urging force of the first tension spring 113 and the bending force of the transport arm 36 is applied to the uppermost medium M (states between C and E in FIG. 28).

In the medium transporting unit 31 having the above-mentioned load characteristic, the driving motor 37 is stopped at a proper position (for example, position of D in FIG. 28) in the state where the pressing force obtained by adding the urging force of the second tension spring 119 to the urging force of the first tension spring 113 and the bending force of the transport arm 36 is applied to the medium M (state between C and E in FIG. 28).

As a result, among the stacked mediums M in the blank medium stacker 21, a proper load (about 10 N) can be applied to the uppermost medium M. Accordingly, regardless of the adhesion to the second medium M, it is possible to satisfactorily move laterally and position the medium M by the use of the guide surface 135b of the medium guide 133.

Even when the center position of the medium M runs off, it is possible to satisfactorily insert the medium guide 133 into the center hole Ma of the medium and to position the medium, by applying a load.

When the rigidity of the transport arm 36 is enhanced and the spring constant of the second tension spring 119 is increased, it is possible to obtain a necessary load by reducing the stroke of the belt clip 112 for generating the bending force of the transport arm 36 (state between B and C in FIG. 28).

When the medium M is lifted up from the medium trays 41a and 51 of the medium drive 41 and the label printer 11 including only a single medium M, ST6 is performed as the determination result whether the destination of the transport arm 36 is the blank medium stacker 21 or the medium tray 51 of the medium tray 41a receiving a single medium (ST4) and only pulse T1 is thus applied to the driving motor 37 (ST6).

In this case, the driving motor is stopped in the region (clearance S in FIG. 7) where the belt clip 112 fixed to the timing belt 104 is lifted down against the urging force of the first tension spring 113 having a small spring force. The medium M can be held by the use of the holding mechanism 130 in the state (state between A and B in FIG. 28) where the first elastic pressing force including the urging force of the first tension spring 113 having a small spring force is applied until the belt clip 112 comes in contact with the pressing lever 116 after the holding portion of the transport arm 36 comes in contact with the medium M. As a result, since the load applied on the medium trays 41a and 51 at the time of tacking out the medium M can be reduced, it is possible to suppress the overload due to the load on the medium trays 41a and 51.

In this way, in a state where the second elastic pressing force is applied to the uppermost medium M in the blank medium stacker 21, the holding claws 141 to 143 inserted into the center hole Ma of the medium M are made to move outward and are pressed on the inner circumferential surface Mb of the center hole Ma.

Specifically, first, when the electromagnetic solenoid 176 is turned off and the operation rod 176a thereof is made to protrude by action of the spring force, the swinging plate 161 connected to the operation rod 176a through the link 175 swings in the direction of R1. Accordingly, the other swinging plates 162 and 163 swing in the direction of R1 by means of the tension of the tension coil spring 174, similarly to the swinging plate 161. As a result, the holding claws 141 to 143 move outward and the holding claws 141 to 143 are pressed on the inner circumferential surface Mb of the center hole of the medium M, thereby holding the medium M.

At this time, since the swinging plates 162 and 163 swing in the direction of R1 by means of the tension of the tension coil spring 174 independently of the swinging plate 161, the holding claws 141 to 143 also move outward in the radius direction independently of each other and are pressed on the inner circumferential surface Mb of the center hole Ma of the medium M.

Therefore, even when the center position of the uppermost medium M runs off from the pickup center, the holding claws 141 to 143 move outward independently and thus all the holding claws 141 to 143 come in contact with the inner circumferential surface Mb of the center hole Ma of the medium M, thereby satisfactorily preventing holding failure and the like.

In addition, the downward protruding length of the holding claws 141 to 143 is equal to or less than the thickness of the medium to be held. Accordingly, even when the center position of the second medium M runs off from that of the uppermost medium M, it is possible to prevent such a problem that the holding claws 141 to 143 come in contact with the edge of the center hole Ma of the second medium M to cause the holding failure.

When the medium M is held in this way, the held medium M is lifted up by lifting up the transport arm 36 in the state where the holding claws 141 to 143 move outward in the diameter direction. At this time, since the held uppermost medium M is satisfactorily held by all the holding claws 141 to 143, it is possible to smoothly pick up the medium without any holding failure.

When the transport arm 36 moves up to pick up the medium M, the pressing lever 182 of the separation mechanism 131 swings in the direction of arrow R3 in FIG. 21 about the connection point 181 and thus the operation piece 183 protrudes to the outside of the medium guide 133.

Therefore, even if the second medium M is lifted up by adhesion to the lifted uppermost medium M, the operation piece 183 of the pressing lever 182 comes in contact with the inner circumferential surface Mb of the center hole Ma of the second medium M to satisfactorily separate the second medium, thereby lifting up only the uppermost medium M.

As described above, in the medium transporting unit 31 according to the embodiment, the holding portion 132 of the transport arm 36 comes in contact with the medium M by selectively applying one of the first elastic pressing force and the second elastic pressing force greater than the first elastic pressing force to the medium M at the time of lifting down the transport arm 36. As a result, it is possible to position the medium M by the use of the medium guide 133 with a proper pressing force depending on the receiving state of the medium M and to then hold the medium by the use of the holding mechanism 130.

For example, when the pressing force is hardly necessary at the time of positioning and the single medium M received in the medium trays 41a and 51 of the drive 41 and the printer 11 which should be picked up with a small pressing force is positioned and held, the holding portion 132 can be pressed with the first elastic pressing force relatively small. When a positional error may be greatly caused and the uppermost medium M of the stacked mediums M in the medium stacker 21 and 22 which are closely adhered to the just-below medium M to generate an adhesive force is positioned and held, the holding portion 132 can be pressed on the medium M with the second elastic pressing force greater than the first elastic pressing force. Accordingly, it is possible to hold the medium M in the medium trays 41a and 51 of the drive 41 and the printer 11, without causing any problem with the medium dray 41a and 51 due to the excessive pressing force.

Until the belt clip 112 as the lift member that is lifted up and down by the timing belt 104 comes in contact with the pressing lever 116, the urging force of the first tension spring 113 can be used as the first elastic pressing force. From the state where the belt clip 112 comes in contact with the pressing lever 116 and the pressing lever 116 swings, the urging force of the first tension spring 113, the bending force of the transport arm 36, and the urging force of the second tension spring 119 can be easily and properly set as the second elastic pressing force.

By providing the second tension spring 119, it is possible to prevent an excessive load from being applied to the medium in the state between C and E in FIG. 28. It is also possible to prevent an excessive load from being applied to the driving motor 37 and thus to employ a cheaper motor.

Since the contact surfaces 151a to 153a of the supporting pins 151 to 153 can urge using the stronger urging force of the second tension spring 119, it is possible to improve the satisfactory holding by means of the satisfactory contact with the medium M.

In the medium stackers 21 and 22, the uppermost medium M can be made to laterally slide and positioned by the use of the medium guide 133 against the adhesive force to the just-below medium M, thereby satisfactorily holding the medium by the use of the holding mechanism 130.

Since the publisher 1 has the medium transporting unit 31 which can satisfactorily position and hold the medium M, it is possible to provide a processing apparatus with high reliability.

The invention may be modified in various forms without being limited to the above-mentioned embodiments. For example, the control of the driving motor 37 having a lift function in the medium transporting unit 31 is selected, after the detector 22 is turned on in FIG. 29 to detect whether the stacker is a single tray. It may be determined that it is a tray when the transport arm is located at the home position and that it is the stacker when the transport arm 36 moves to the medium stackers 21 and 22. Alternatively, the determination may be performed when the medium to be held is instructed before the transport arm 36 moves.

Although the timing belt has been used as the lift member, a lifting configuration using a rotating shaft on which a spiral groove is formed may be used. Although the holding mechanism has pressed the inner circumferential surface of the medium, a claw shape engaging with the rear surface or the edge portion of the rear surface through the center hole may be used, or the top surface of the medium may be held by suction.

Although the tension spring has been used to urge the transport arm 36, a compression spring or a twisted coil spring may be used, but the tension spring is advantageous for management and assembly.

What is claimed is:

1. A medium transporting unit for transporting a top medium from a stacker in a stacked manner, the medium transporting unit comprising:
   a holding mechanism operable to hold the top medium;
   a transport arm provided with the holding mechanism; and
   a lift mechanism operable to lift up and down the transport arm,
   wherein the holding mechanism is configured to apply a first pressing force to an upper surface of the top medium after the holding mechanism comes in contact with the upper surface of the top medium until the holding mechanism is lifted down by a predetermined distance, and to apply a second pressing force greater than the first pressing force to the upper surface of the top medium when the holding mechanism is lifted down than the predetermined distance.

2. The medium transporting unit as set forth in claim 1, wherein the transport arm includes:
   a lifted member fixed to the lift mechanism to be lifted up and down;
   a first urging member operable to urge the lifted member upward with a first urging force; and
   a second urging member operable to urge the lifted member upward with a second urging force greater than the first urging force, and
   wherein the second urging member applies the second urging force to the lifted member when the lifted member is lifted down by a predetermined distance.

3. The medium transporting unit as set forth in claim 1, wherein the stacker further comprises a tray,
   wherein when the holding mechanism holds a medium placed in the tray, the holding mechanism applies the first pressing force to the medium, and
   wherein when the holding mechanism holds a medium stored in the stacker, the holding mechanism applies the second pressing force to the medium.

4. The medium transporting unit as set forth in claim 1, wherein the holding mechanism includes a medium guide having a circular truncated cone shape directed downward and adapted to be inserted into a center hole formed on the medium in order to move and position the medium laterally.

* * * * *